United States Patent
Ho et al.

(10) Patent No.: US 10,930,036 B2
(45) Date of Patent: *Feb. 23, 2021

(54) BAR CHART OPTIMIZATION

(71) Applicant: Oracle International Corporation, Redwood Shores, CA (US)

(72) Inventors: Pangus Ho, North Billerica, MA (US); Hugh Zhang, Winchester, MA (US); Prashant Singh, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,610

(22) Filed: Apr. 27, 2020

(65) Prior Publication Data

US 2020/0258275 A1    Aug. 13, 2020

Related U.S. Application Data

(63) Continuation of application No. 15/679,589, filed on Aug. 17, 2017, now Pat. No. 10,672,157.

(51) Int. Cl.
*G06T 11/20* (2006.01)
*G06F 16/248* (2019.01)

(52) U.S. Cl.
CPC .......... *G06T 11/206* (2013.01); *G06F 16/248* (2019.01)

(58) Field of Classification Search
CPC .......................... G06T 11/206; G06F 16/248

USPC ........................................................ 345/440
See application file for complete search history.

(56) References Cited

U.S. PATENT DOCUMENTS

| | | | |
|---|---|---|---|
| 2005/0125086 A1 | 6/2005 | Noda | G05B 19/41865 |
| 2005/0177598 A1* | 8/2005 | Hao | G06T 11/206 |
| 2006/0059439 A1 | 6/2006 | Hao | G06T 11/206 |
| 2008/0086679 A1 | 4/2008 | Gazzillo | G06F 17/211 |
| 2008/0192056 A1* | 8/2008 | Robertson | G06T 11/206 345/440 |
| 2011/0115814 A1 | 5/2011 | Heimendinger | G06F 3/04883 |
| 2015/0025981 A1 | 1/2015 | Zaretsky | G06F 16/9566 |
| 2016/0180578 A1 | 6/2016 | Vegesna | G06T 11/206 |

* cited by examiner

*Primary Examiner* — Ke Xiao
*Assistant Examiner* — Kim Thanh T Tran
(74) *Attorney, Agent, or Firm* — Trellis IP Law Group, PC

(57) ABSTRACT

Implementations generally relate to optimizing bar charts. In some implementations, a method includes receiving a plurality of data points, where each data point of the plurality of data points has a value. The method further includes determining a plurality of bars of the bar chart based on the plurality of data points, where each bar of the plurality of bars has a length and a width. The method further includes associating at least portions of a plurality of pixels used to render the bar chart with the plurality of bars. The method further includes determining for each pixel or pixel portion, at least one or more of a highest positive bar and/or a lowest negative bar. The method further includes rendering for individual pixels or pixel portions, one or more of the respective highest positive bar and/or the respective lowest negative bar.

20 Claims, 14 Drawing Sheets

BAR CHART OPTIMIZATION

CROSS REFERENCES TO RELATED APPLICATIONS

This application is a continuation of the following application, U.S. patent application Ser. No. 15/679,589, entitled BAR CHART OPTIMIZATION filed on Aug. 17, 2017, which is hereby incorporated by reference as if set forth in full in this application for all purposes.

BACKGROUND

Bar charts are one of the most common data visualization techniques, using rectangular shapes to compare values across categories or time. In enterprise applications, a bar chart is often used as a default chart type to visualize arbitrary datasets due to its ubiquity and familiarity. Datasets can be huge, and the larger the dataset the longer it takes to render a bar chart.

SUMMARY

Implementations generally relate to optimizing bar charts. Implementations improve the rendering of bar charts for large datasets and achieve computation time-savings by omitting the display of bars that would not be visible to the user.

In some implementations, an apparatus includes one or more processors, and includes logic encoded in one or more non-transitory computer-readable storage media for execution by the one or more processors. When executed, the logic is operable to perform operations including receiving a plurality of data points, where each data point of the plurality of data points has a value. The logic is further operable to perform operations including determining a plurality of bars of the bar chart based on the plurality of data points, where each bar of the plurality of bars has a length and a width. The logic is further operable to perform operations including associating a plurality of pixels used to render the bar chart with the plurality of bars. The logic is further operable to perform operations including determining for each pixel of the plurality of pixels at least one or more of a highest positive bar and a lowest negative bar. The logic is further operable to perform operations including rendering for each pixel one or more of the respective highest positive bar and the respective lowest negative bar.

A further understanding of the nature and the advantages of particular embodiments disclosed herein may be realized by reference of the remaining portions of the specification and the attached drawings.

DETAILED DESCRIPTION OF EMBODIMENTS

Figure 1:
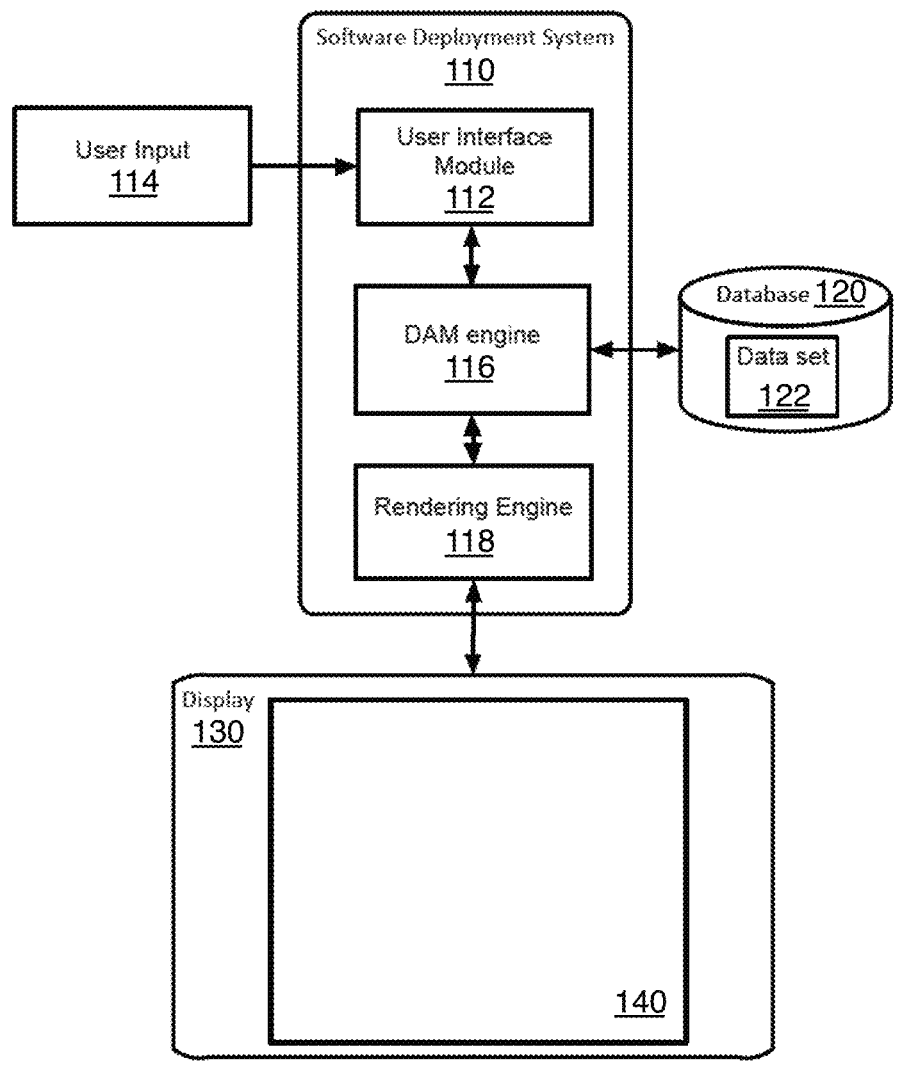
FIG. 1 illustrates an example block diagram of a computing system, which may be used for implementations described herein.

Implementations described herein optimize bar chart rendering in a graphical user interface using high-fidelity data filtering and path aggregation techniques. As described in more detail herein, implementations improve the performance of scalable vector graphics (SVG) bar charts with large datasets by omitting the display of bars that would not be visible to the user. This achieves improved rendering of bar charts for large datasets and achieves computation time-savings.

As described in more detail herein, in various implementations, a system receives data points. The system further determines the bars of a bar chart based on the data points, where each bar has a length and a width. The length of each bar corresponds to a value of an associated data point. For example, bars representing data points having higher values are longer than bars representing data points having lower values. In various implementations, the system sets the width of each bar to a predetermined number of pixels in width (e.g., one pixel). The system further associates pixels used to render the bar chart with the bars. The system further determines for each pixel at least one or more of a highest positive bar and a lowest negative bar. The system further renders for each pixel one or more of the respective highest positive bar and the respective lowest negative bar. As described in more detail herein, the system may render multiple bars using multiple rendering paths, or may render multiple bars using a single rendering path. Implementations described herein are applicable to any data visualization products that support bar charts.

The following are definitions to provide further context and applications of implementations described herein. In various implementations, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Software functionality may be any function, capability, or feature, e.g., stored or arranged data, that is provided via computer code, e.g., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

In various implementations, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

An enterprise computing environment may be any collection of computing resources of an organization used to perform one or more tasks involving computer processing. An example enterprise computing environment includes various computing resources distributed across a network, and may further include private and shared content on intranet web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include human resources (HR) (e.g., enterprise personnel), financial resources, assets, employees, business contacts, sales data, and so on, of an enterprise. Examples of enterprise software include enterprise resource planning (ERP) software for facilitating managing enterprise activities (e.g., product planning, inventory management, marketing, sales, and so on). Example ERP applications include customer relationship management (CRM), human capital management (HCM), business intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as UI software modules or components.

Note that conventionally, while certain financial tools, tables, and so on (e.g., balance sheets, cash flow statements, etc.), are standardized, different companies may prefer to maintain and view operational and financial planning data and tasks differently, e.g., in accordance with different business and computing environment requirements. This can be particularly true at granular levels, i.e., where detailed enterprise data must be observed and analyzed in accordance with business planning objectives.

For example, a particular service company may experience substantial compensation expenses (e.g., payments to employees, contractors, etc.), which may represent the primary driver for expense planning. Similarly, a small consulting company may experience substantial travel expenses, which may represent a primary driver for expense planning. Accordingly, two different service companies may base their expense planning on substantially different drivers.

Similarly, different companies may employ different methods of accounting, e.g., a direct method or indirect method of accounting. Accordingly, different companies may rely upon different drivers for handling accounting details.

Furthermore, the granularity of planning (i.e., the level of detail demanded or required) may vary across different companies and/or business types, segments, or other domains. For example, a fast moving consumer goods company may plan revenue by product, market, channel, and segment, whereas an information technology (IT) company may plan revenue by service, market, and customers. Accordingly, different companies may rely upon different drivers for various types of planning.

In addition, while certain companies may prefer to perform business planning using a collection of standard or common drivers and associated software modules and functionality (e.g., standard labor, material, etc.), other companies may prefer to perform direct entry for project expenses, revenue, etc.

Accordingly, different businesses may have different planning requirements or needs, which can be difficult to meet using conventional static business planning modules and associated software applications. Certain implementations discussed more fully below provide systems and accompanying mechanisms and methods for enabling dynamic adaptation of an existing initial business planning model (which may be called a seed model herein), thereby enabling the initial seed planning model to uniquely grow to meet individual or specific needs of a given business or organization.

For clarity, certain well-known components, such as hard drives, processors, operating systems, power supplies, routers, Internet service providers (ISPs), identity management systems, workflow orchestrators, process schedulers, integration brokers, tenant automation systems (TASs), online analytical processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 illustrates an example block diagram of a computing system 100, which may be used for implementations described herein. Computing system 100 provides an interface layer, such as an application program interface (API). The interface layer provides users with seamless connectivity between different instantiations of an application located in different environments (e.g., development environment, production environment, etc.). Computing system 100 may be any computing system, such as an enterprise computing environment, client-server system, and the like.

Computing system 100 also includes software management system 110, also referred to herein as software deployment system 110. Software management system 110 may include a user interface module 112. User interface module 112 may be configured to receive and process data signals and information received from a user interface 114, also referred to herein as user input 114. For example, user interface module 112 may be adapted to receive and process data from user input associated with data for processing via software management system 110. Software management system 110 is configured to process data received from user interface 114, such as a keyboard, mouse, etc. for receiving user input.

Software management system 110 may also include a process engine 116, also referred to herein as digital asset management (DAM) engine 116, and a rendering engine 118. Process engine 116 may be configured as an API or any interface or data structure that may be used to advantage.

In some implementations, computing system 100 may include a data source such as database 120. Database 120 may be connected to the software management system 110 directly or indirectly, for example via a network connection, and may be implemented as a non-transitory data structure stored on a local memory device, such as a hard drive, solid state drive (SSD), flash memory, and the like, or may be stored as a part of a cloud network, as further described herein.

Database 120 may contain one or more data sets 122. Data sets 122 may include data as described herein. Data sets 122 may also include data pertaining to data attributes, data hierarchy, nodal positions, values, summations, types of charts of visualizations, algorithms, code (e.g., C++, Javascript, JSON, etc.), source, security, hashes, XML, and the like. In addition, data sets 122 may also contain other data, data elements, and information such as metadata, labels, development-time information, run-time information, configuration information, API, interface component information, library information, pointers, and the like.

In various implementations, software management system 110 is connected to a display 130 configured to display data 140 (e.g., graphical data, etc.), for example, to a user thereof. Display 130 may be a passive or an active display, adapted to allow a user to view and interact with display data 140 displayed thereon, via user interface 114. In other configurations, display 130 may be a touch screen display responsive to touches, gestures, swipes, and the like for use in interacting with and manipulating display data 140 by a user thereof. Gestures may include single gestures, multi-touch gestures, and other combinations of gestures and user inputs adapted to allow a user to convert, model, generate, deploy, and maintain display data 140.

In various implementations, process engine 116 may be adapted to receive data from user interface 114 and/or database 120 for processing thereof. In one configuration, process engine 116 is a software engine configured to receive and process input data from a user thereof pertaining to display data 140 from user interface 114 and/or database 120 in order to provide the process API layer.

Process engine 116 in other implementations may be configured as a data analysis tool to perform analysis functions associated with display data 140. Such analysis functions may include determining attributes associated with the data, partitions, local and remote pods (layers), communication protocols, determining the relationships to other data, interpreting metadata associated with the data, and the like. For example, process engine 116 may be configured to receive and analyze data sets 122 to determine user interface configuration, data processing instructions, data attributes, data hierarchy, nodes, nodal positions within the hierarchy, values, summations, algorithms, source, security, hashes, and the like, associated with data sets 122.

Process engine 116 may receive existing data sets 122 from database 120 for processing thereof. Such data sets 122 may include and represent a composite of separate data sets 122 and data elements pertaining to, for example, organizational data, which may include employment data, salary data, personnel data, and the like. In addition, data sets 122 may include other types of data, data elements, and information such as contact data, sales data, production data, scientific data, financial data, medical data, census data, and the like.

Rendering engine 118 may be configured to receive configuration data pertaining to display data 140, associated data sets 122, and other data associated with display data 140 such as user interface components, icons, user pointing device signals, and the like, used to render display data 140 on display 130. In one exemplary implementation, rendering engine 118 may be configured to render two-dimensional (2D) and three-dimensional (3D) graphical models and simulations to allow a user to obtain more information about data sets 122. In one implementation, upon receiving instruction from a user, for example, through user interface 114, rendering engine 118 may be configured to generate a real-time display of interactive changes being made to display data 140 by a user thereof.

Note that the computing system 100 presents a particular example implementation, where computer code for implementing embodiments may be implemented, at least in part, on a server. However, embodiments are not limited thereto. For example, a client-side software application may implement software management system 110, or portions thereof, in accordance with the present teachings without requiring communications between the client-side software application and a server.

As described in more herein, a bar chart may have a large dataset (in the order of thousands of data points or more). Many bars of a bar chart will not be visible because they are completely covered by the other overlapping bars. Implementations improve the render time of a bar chart by skipping the rendering of the obscured bars.

Figure 2:
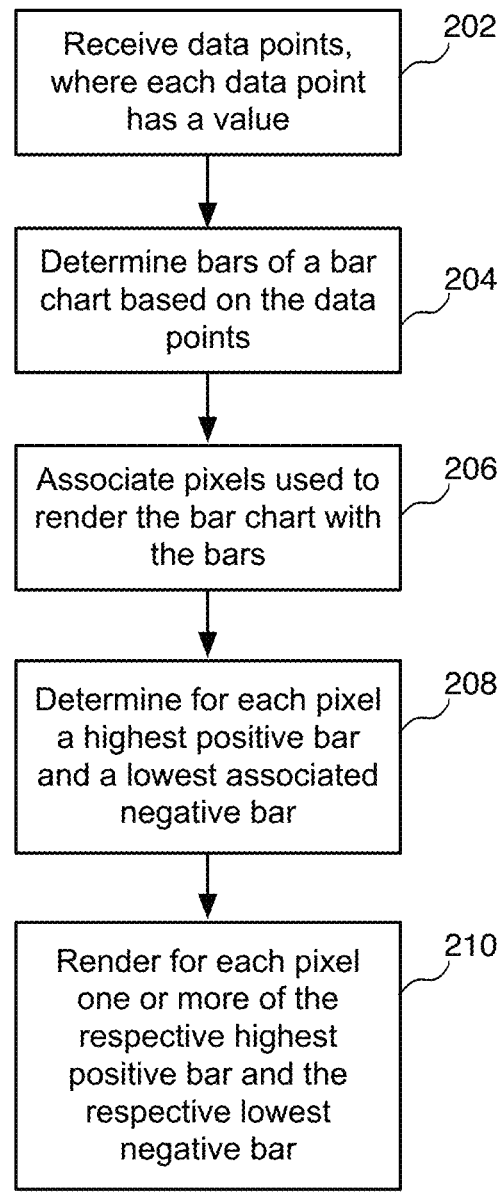
FIG. 2 illustrates an example flow diagram for optimizing a bar chart rendering in a graphical user interface using a filtering technique, according to some implementations.

FIG. 2 illustrates an example flow diagram for optimizing a bar chart rendering in a graphical user interface using a filtering technique, according to some implementations. As described in more detail herein, the system provides chart rendering optimization by filtering bars of a bar chart such that a portion of the bars are ultimately rendered. Rendering a subset of the total number of bars decreases the rendering time of the bar chart. In various implementations, a method is initiated at block 202, where the system receives data points, where each data point has a value. In some implementations the system may be a server. In some implementations the system may be a client device. In various implementations, the data points may be provided by customers of an enterprise and/or collected by other suitable means. The types of values and units of the data point may vary, depending on the particular implementation. For example, data point values may include time, currency, volume, etc.

At block 204, the system determines bars of a bar chart based on the data points. In various implementations, each bar represents a data point (e.g., one of the received data points). In other words, for every data point, there is an associated bar.

Figure 3:
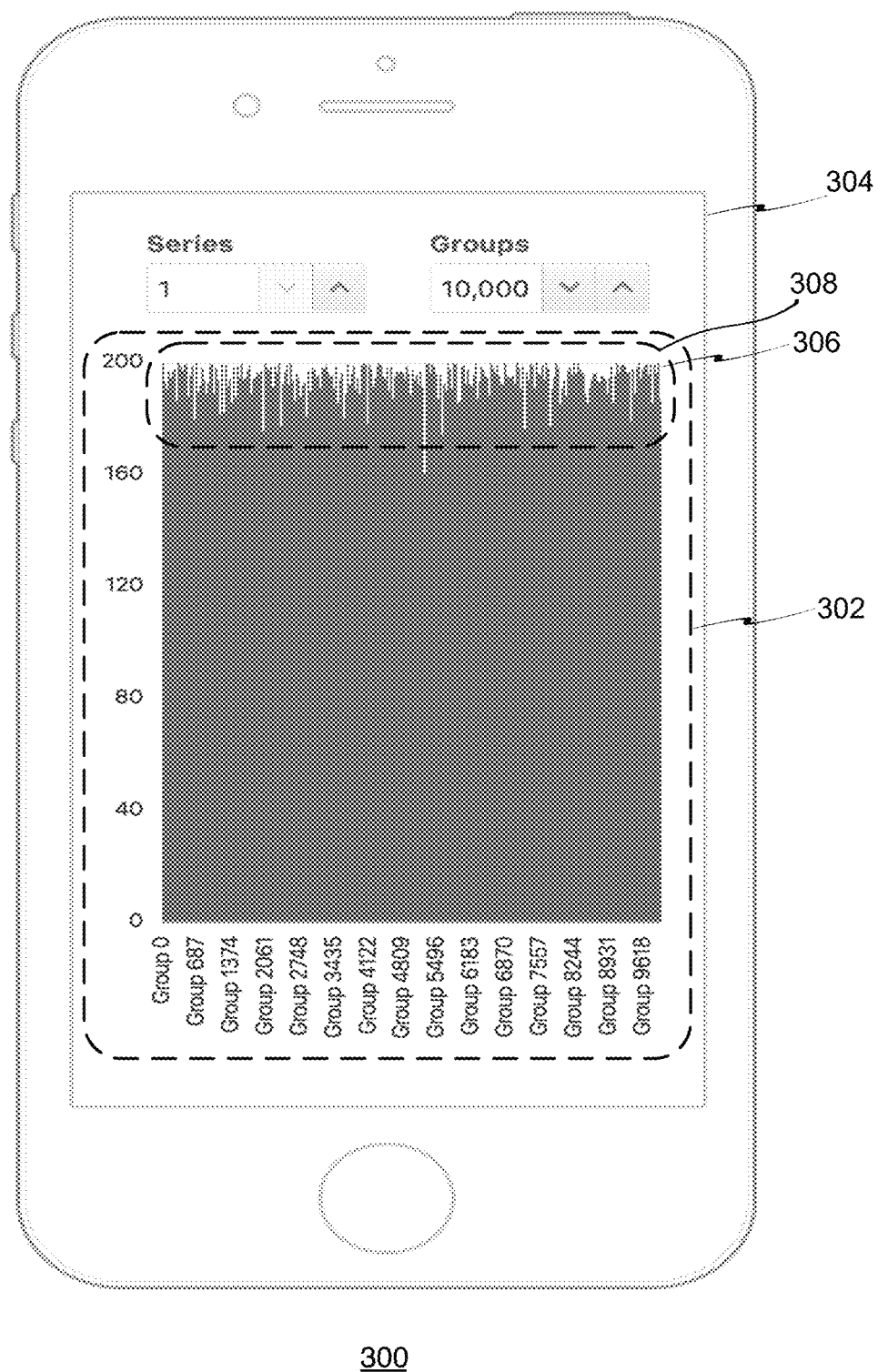
FIG. 3 illustrates an example device that is displaying an example bar chart, according to some implementations.

FIG. 3 illustrates an example device 300 that is displaying an example bar chart 302, according to some implementations. As shown, device 300 includes a display 304 that displays bar chart 302. Bar chart 302 includes multiple bars such as bar 306.

Note that bar chart 302 is rendered at block 210 of FIG. 2, and is introduced and described here for ease of illustration of various bar chart aspects. Also, while some implementations are described herein in the context of vertical bar charts, these implementations and others also apply to horizontal bar charts, as well as to other types of bar charts or graphs. For example, implementations may apply to stacked bar charts, example implementations of which are described in more detail herein. Implementations may also apply to grouped bar charts, double bar charts, segmented bar charts, etc.

Each bar has a length and a width. In various implementations, the length of each bar corresponds to a data point. As shown in the particular example, there are 10,000 data points (labeled Groups) having values ranging from 0 to 200. The particular number of data points and corresponding bars, and the range of values may vary depending on the particular implementation. As indicated herein, the particular units of the data point values will depend on the particular implementation.

As shown, the top portions 308 of the bars vary, where different bars have different lengths or heights, depending on the respective values of the data points. While in this particular example implementation, there are numerous bars making individual bars less identifiable, bar chart 302 has various uses. For example, bar chart 302 may be used to show trends in the data points (e.g., increasing values, decreasing values, value ranges, anomalies, etc.).

Referring still to FIG. 2, at block 206, the system associates pixels used to render the bar chart with the bars. In various implementations, each pixel that is associated with a bar may be referred to as a bar pixel. A bar pixel may be a pixel that is used to render a bar of a bar chart, as opposed to other pixels (e.g., pixels used as spaces between bars, pixels used to render text or other annotations of a bar chart, etc.). In some implementations, bar pixels for vertical bar charts form a vertical column of pixels. In some implementations, bar pixels for horizontal bar charts form a horizontal row of pixels. A given bar pixel and its associated column of pixels may be occupied by one or more bars.

As described in more detail herein, each bar has a length and a width, and the system associates a particular number of pixels to size and render the width of each bar, where the width is a predetermined width. The system also associates a particular number of pixels to size and render the length of the each bar, where the length is based on the value of the associated data point.

Figure 4:
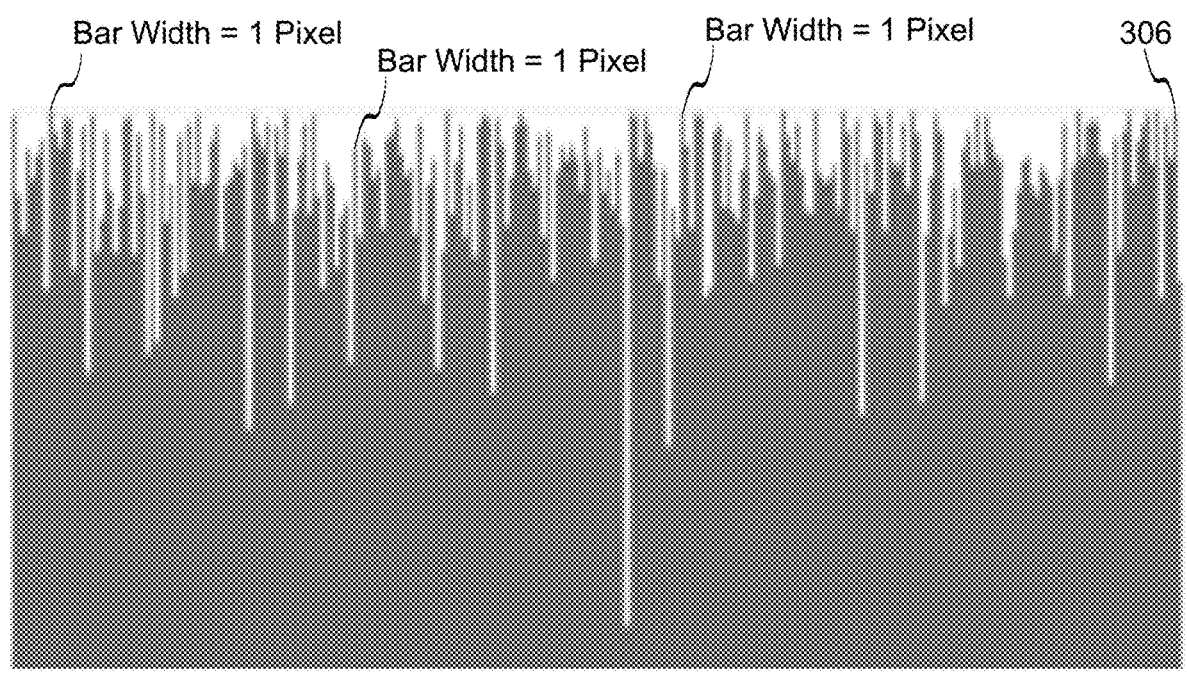
FIG. 4 illustrates top portions of a bar chart, according to some implementations.

FIG. 4 illustrates top portions 308 of bar chart 302 of FIG. 3, according to some implementations. Each bar is rendered by a vertical column of pixels. For example, bar 306 and the rest of the bars are rendered by a vertical column of pixels.

In various implementations, the system sets the width of each bar to a predetermined width. In some implementations, the predetermined width is relative to a pixel. In some implementations, the predetermined width is one pixel, and the system rounds their x-coordinates. For example, the width of bar 306, as well as the width of the rest of the bars, are one pixel wide. The particular width of the pixels may vary depending on the particular implementation. In some implementations, each bar has a horizontal pixel, which is the top pixel of each bar. If the bars were wider, each bar would have multiple horizontal pixels, depending on the actual width.

In an example implementation for a 500 pixel-wide bar chart with 10,000 data points (bars), the bars are usually drawn with 500 pixels/10,000=0.05 pixel width. However, such thin bars may look fuzzy and may disappear in the browser rendering of the SVG. Setting a minimum width of 1 pixel ensures that the resulting chart stays sharp when the data density is high. Rounding the x-coordinates ensures that each bar shape occupies exactly one horizontal pixel and does not bleed to the neighboring pixels, allowing the data filtering technique to work properly.

In some implementations, the predetermined width may be less than pixel. For example, some display devices may have 2 or more physical pixels for each logical pixel. As such, the system may reduce the filtering rate. For example, if the device-pixel-ratio is 2, the system may reduce the filtering rate by half (e.g. render the highest positive bar and lowest negative bar for every ½ pixel).

At block 208, the system determines for each pixel a highest positive bar and a lowest associated negative bar that is associated with each pixel. For example, for a vertical bar chart such as bar chart 302 of FIG. 3, a given pixel may be a part of a vertical column of pixels. The vertical column of pixels may be associated with multiple data points, where the data points associated with the vertical column of pixels have different values. The values may be positive values and/or negative values. A positive bar is based on a data point having a positive value, and a negative bar is based on a data point having a negative value.

Figure 5:
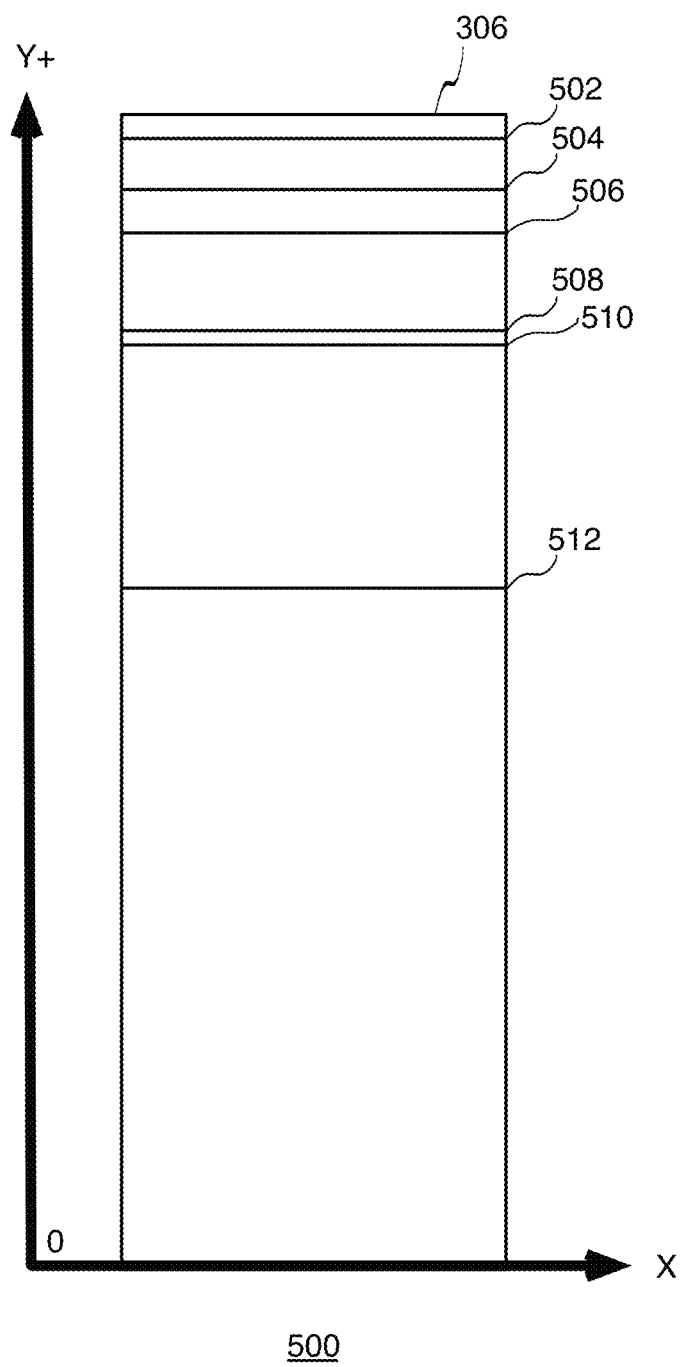
FIG. 5 illustrates overlapping bars of a bar chart, according to some implementations.

FIG. 5 illustrates overlapping bars 500 of a bar chart, according to some implementations. As shown, overlapping bars 500 include bar 306 of FIGS. 3 and 4, where bar 306 has a particular value (e.g., 190). In other words, bar 306 represents a data point having a particular value. The topmost horizontal line shown represents the top of bar 306. Also shown are other bars 502, 504, 506, 508, 510, and 512. Bars 502, 504, 506, 508, 510, and 512 have the same width, and these bars have different values, thus different lengths. For example, bar 502 has a lower value (e.g., 187) than the value of bar 306. As such, bar 502 is shorter than bar 306, and the second horizontal line from the top shown represents the top of bar 502. Similarly, bar 504 has a lower value (e.g., 179) than the value of bar 502. As such, bar 504 is shorter than bar 502, and the third horizontal line from the top shown represents the top of bar 504. In various implementations, the system compares the positive values and makes the determination that bar 306 has the highest positive value.

Figure 6:
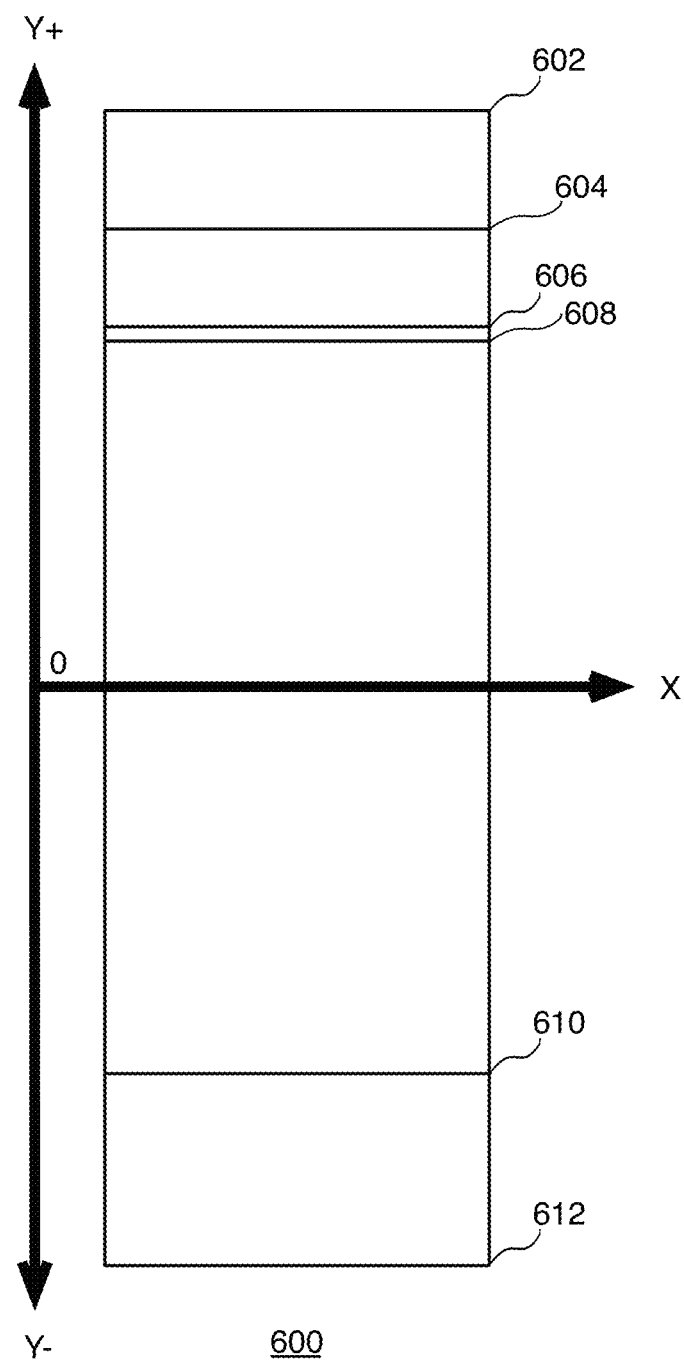
FIG. 6 illustrates overlapping bars of a bar chart, according to some implementations.

FIG. 6 illustrates overlapping bars 600 of a bar chart, according to some implementations. This particular example shows bars 602, 604, 606, and 608 having positive values, and bars 610 and 612 having negative values. Bar 602 has the highest positive value and bar 612 has the lowest negative value. In various implementations, the system compares the positive values and makes the determination that bar 602 has the highest positive value. The system also compares the negative values and makes the determination that bar 612 has the lowest negative value.

In some implementations, the system may generate a data structure that includes data elements, where each data element corresponds to a pixel used to render a bar chart. In various implementations, each data element may include information on an identified pixel, an associated data point, and one or more of an associated highest positive and an associated lowest negative bar to be rendered. The particular information in a data element may vary depending on the particular implementation. For example, each data element may also include information on one or more bars that are not to be rendered.

At block 210, the system renders for each pixel one or more of the respective highest positive bar and the respective lowest negative bar. FIG. 3 shows resulting bar chart 302 with the highest positive bars rendered. For ease of illustration, bar chart 302 shows positive values. In some implementations, a bar chart may be rendered with bars having positive values and bars having negative values.

Figure 7:
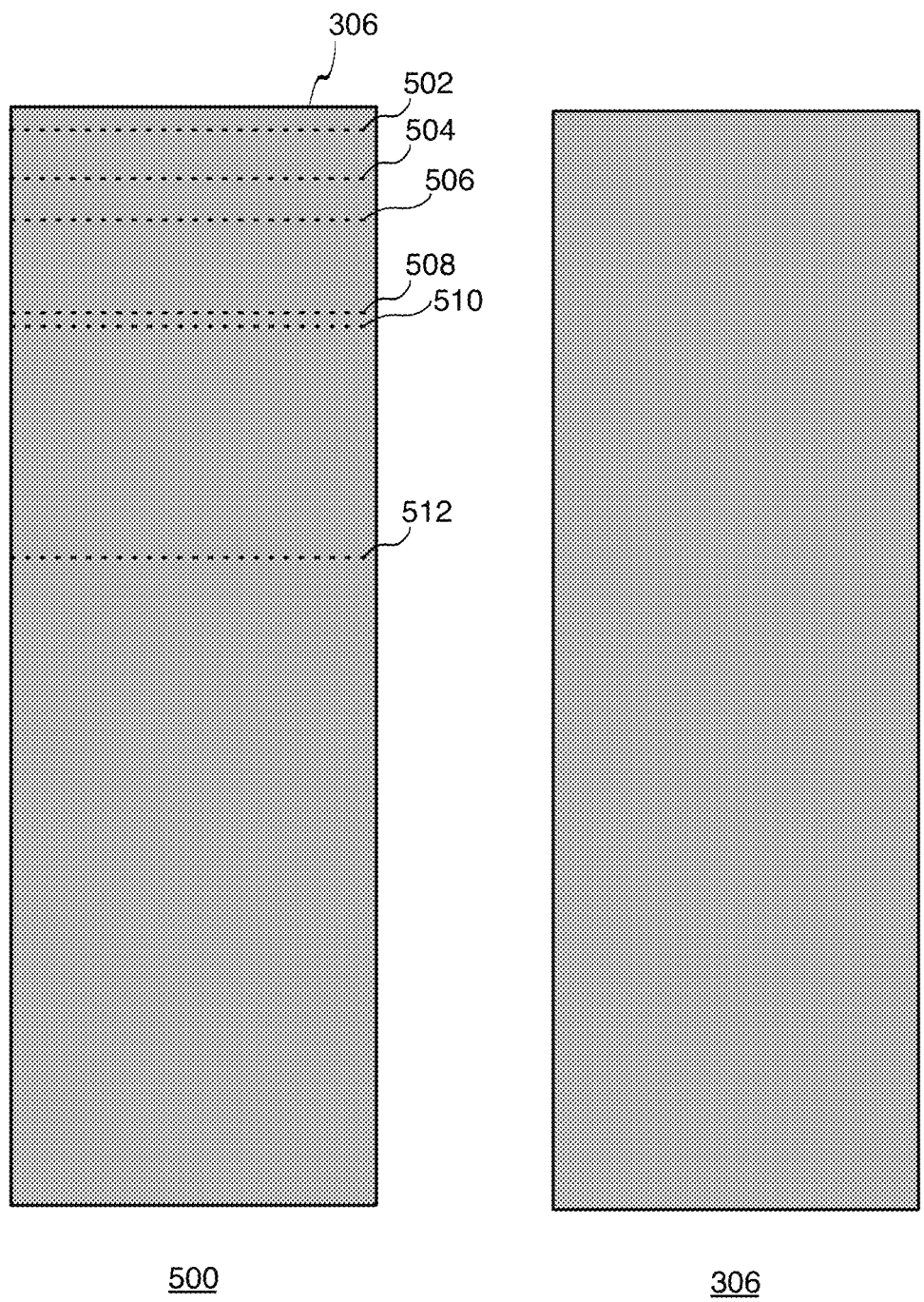
FIG. 7 illustrates a side-by-side comparison between overlapping bars and a bar, according to some implementations.

FIG. 7 illustrates a side-by-side comparison between overlapping bars 500 of FIG. 5 and bar 306 of FIGS. 3 and 4, according to some implementations. In various implementations, bars are rendered with a color coding (e.g., black, red, etc.), where the colors may vary depending on the particular implementation. In various implementations, bars may be a solid color. As such, the shorter overlapping bars 502, 504, 506, 508, 510, and 512 (indicated with dotted lines) would not be visible to the user when all bars are rendered. In other words, the user would only see bar 306. As such, when rendered, overlapping bars 500 of FIG. 5 look the same as bar 306.

By rendering the bars that would be visible to the user (and not rendering the bars that would not be visible to the user, the system reduces the rendering time of the overall bar chart. This time savings is valuable to a user, especially when there are large numbers of data points (e.g., thousands, tens of thousands, hundreds of thousands, etc.).

An unoptimized bar chart uses one or more rectangular shapes to draw each data point. Each data point is represented separately, so the total render time of a bar chart is in the order of O(n), where O(n) means that process running time is dependent on the input size, and where n is the number of data points. In other words, the size of the data set is proportional to the rendering time. For example, if a system receives a dataset that is 10 times larger, the render time of the bar chart will be roughly 10 times slower.

In various implementations, the data filtering technique ensures that the bar chart does not render or draw more than one bar per pixel. For example, if a vertical bar chart is 500 pixels wide and contains 10,000 data points (presuming no bar chart stacking), an unoptimized bar chart would render 20 bars per pixel (vertical column of pixels), but only one bar will be visible to the end user. The data filtering technique ensures that at most two bars are drawn in every pixel (resulting in at most 1,000 bar total), while making sure that the end result is indistinguishable visually for the user. As a result, a bar chart with 10,000 data points or more is rendered at roughly the same speed as a bar chart with only 1,000 data points.

In various implementations, the system determines the number of positive bars associated with a particular pixel, and renders a subset of the positive bars if there are two or more positive bars associated with the pixel. Similarly, the system determines the number of negative bars associated with a particular pixel, and renders a subset of the negative bars if there are two or more negative bars associated with the pixel. If the number of bars (e.g. data points) is significantly low such there is one bar per bar pixel, there would be no need to select the most positive bars. For example, for a 500 pixel wide vertical bar chart with 10,000 data points (bars), each vertical pixel column may contain 20 bars. As such, filtering would reduce the rendering time. If the number of bars in each vertical pixel column is less than 2 (e.g., 1 bar per pixel), no filtering is necessary. Similarly, if there are no bars having negative values, there would be no negative bars to select. As such, in some scenarios, the rendering of a bar chart is sufficiently fast even when rendering all bars.

Figure 8:
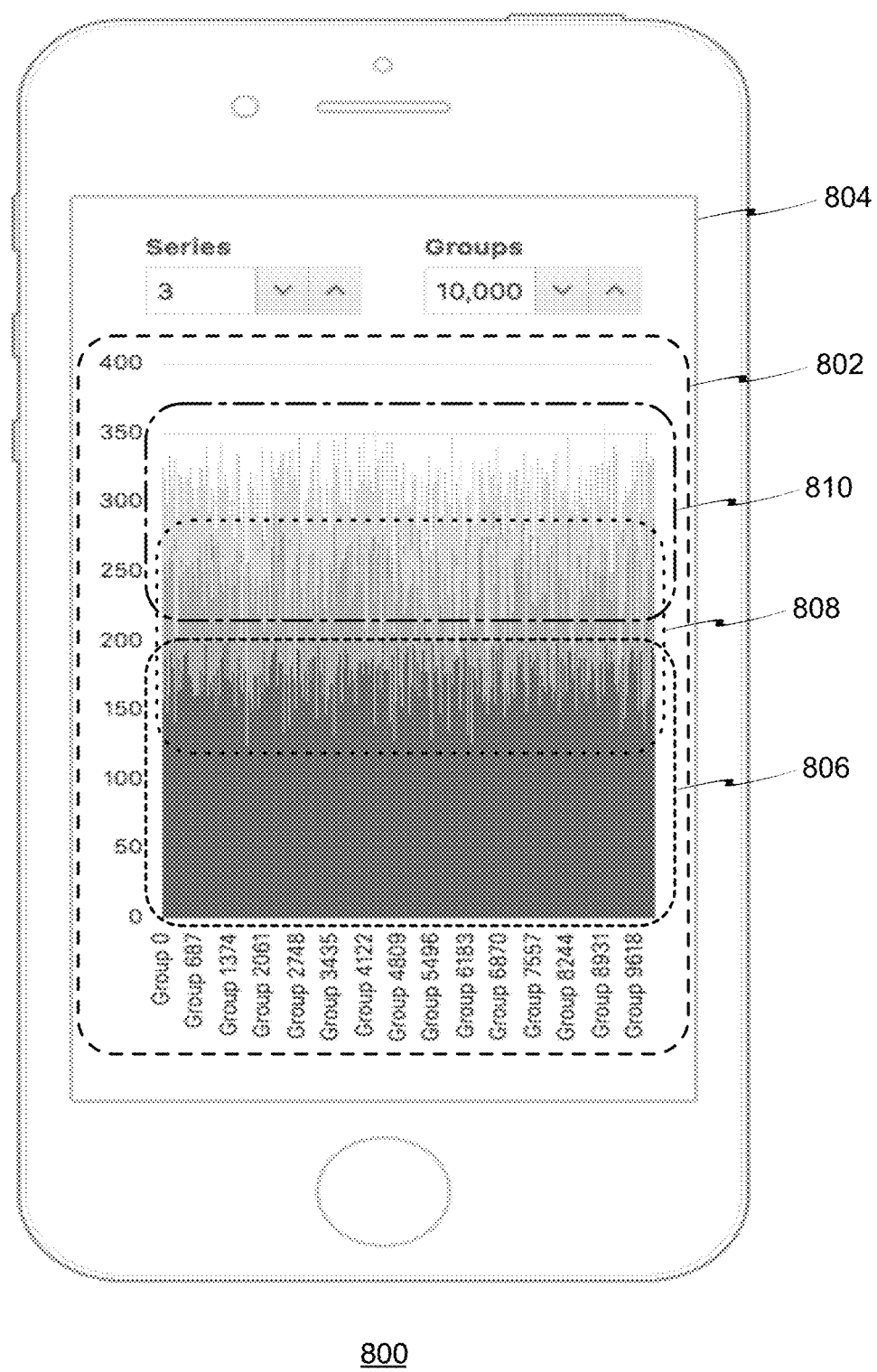
FIG. 8 illustrates an example device that is displaying an example bar chart, according to some implementations.

FIG. 8 illustrates an example device 800 that is displaying an example bar chart 802, according to some implementations. As shown, device 800 includes a display 804 that displays bar chart 802. Bar chart 802 includes multiple stacked bars having a first or bottom layer of bars 806, a second or middle layer of bars 808, and a third or top layer of bars 810. For ease of illustration, three layers of bars are shown. The number of layers of bars may vary depending on the particular implementation.

In various implementations, if there are multiple bar layers or series (stacked or unstacked), where each series of bars has a different color, the system performs the data filtering separately for each series (e.g., each of layers of bars 806, 808, and 810). If the series are stacked as in FIG. 8, the system performs the filtering based on the cumulative values. If there is more than one bar that shares the highest positive value, the system may choose to render the longest bar (e.g. the bar with the lowest base) in order to ensure that the resulting bar chart does not have vertical gaps. The same logic may also be applied when picking the lowest negative bar.

Figure 9:
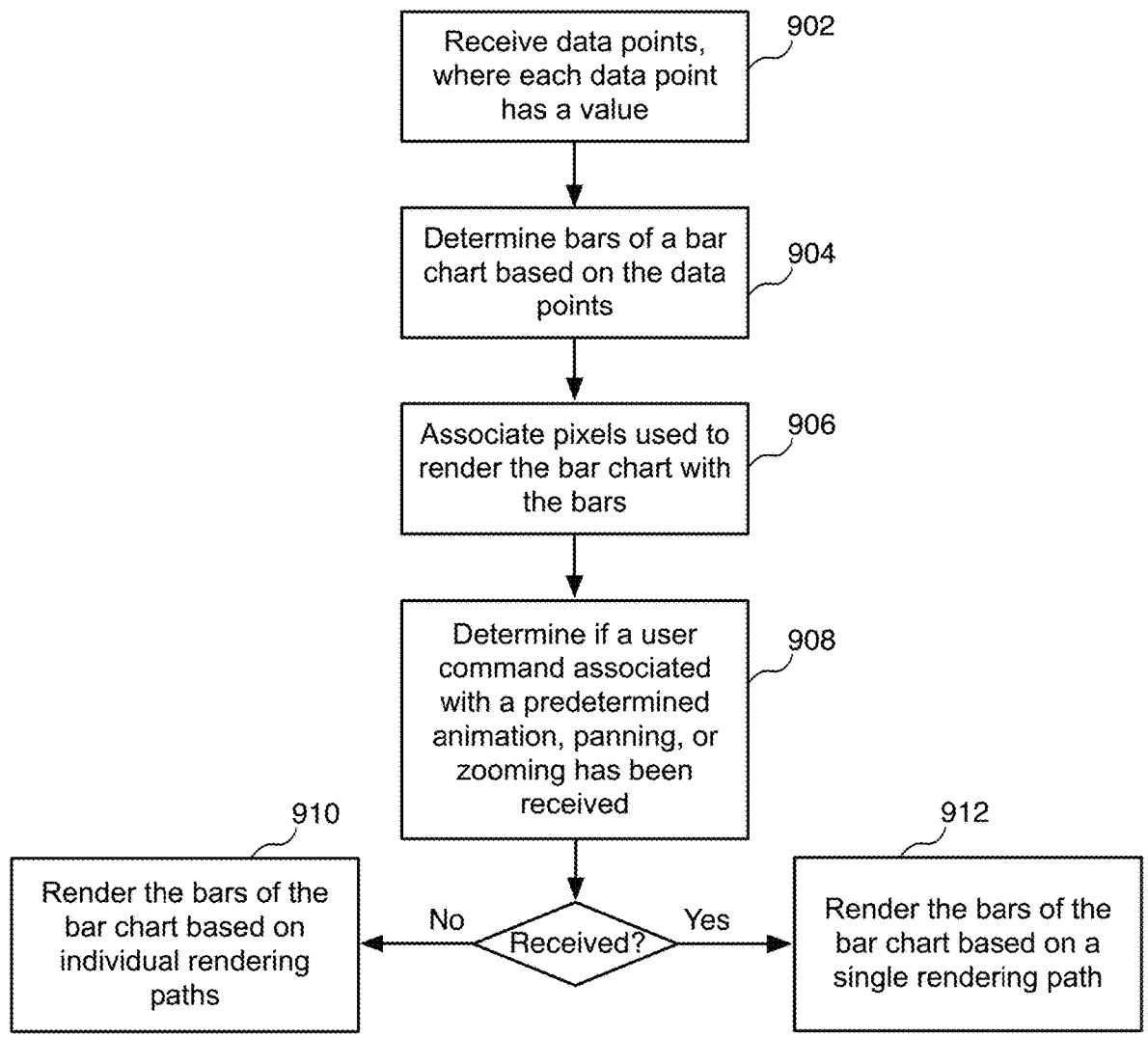
FIG. 9 illustrates an example flow diagram for optimizing a bar chart rendering in a graphical user interface using a path aggregation technique, according to some implementations.

FIG. 9 illustrates an example flow diagram for optimizing a bar chart rendering in a graphical user interface using a path aggregation technique, according to some implementations. In various implementations, a method is initiated at block 902, where the system receives data points, where each data point has a value. As indicated herein, in various implementations, the data points may be provided by customers of an enterprise and/or collected by other suitable means. Also, the types of values and units of the data point may vary, depending on the particular implementation.

At block 904, the system determines bars of a bar chart based on the data points. As indicated herein, in various implementations, each bar represents a data point (e.g., one of the received data points).

At block 906, the system associates pixels used to render the bar chart with the bars, where the pixels are used to render bars of the bar chart.

At block 908, the system determines if a user command associated with a predetermined animation, panning, or zooming has been received. These features are similar in that a user may interact with a group of bars together and/or a group of bars may be visually changed together, as opposed to individually. For example, a user may issue a user command to generate a bar chart. In some implementation, an animation may be associated with the generation of a bar chart. For example, an animation may show bars of the bar chart growing to full length. Example implementations directed to animations associated with user commands are described in more detail herein.

In various implementations, the path aggregation technique may be used when the user does not need to interact with individual data points, for example, through highlighting, selection, drilling, etc. The path aggregation technique may be used to render the intermediate states when the bar chart is animating or when the chart is being panned or zoomed. In other words, the bars of the bar chart visually change together. In some implementations, after the intermediate states of animation or panning or zooming are performed, the system rerenders the bars of a bar chart as individual shapes again if user interaction is desired.

At block 910, if the user command has not been received for the predetermined animation, the system renders the bars of the bar chart based on individual rendering paths. In some implementations, each individually rendering path corresponds to a rendered bar of the plurality of the bars. Example implementations directed to the rendering of bars of the bar chart based on individual rendering paths are described in more detail herein.

At block 912, if the user command has been received for the predetermined animation, the system renders the bars of the bar chart based on a single rendering path. In various implementations, individual rendering paths are aggregated into a single rendering path. Example implementations directed to the rendering of bars of the bar chart based on a single rendering path are described in more detail herein.

Figure 10:
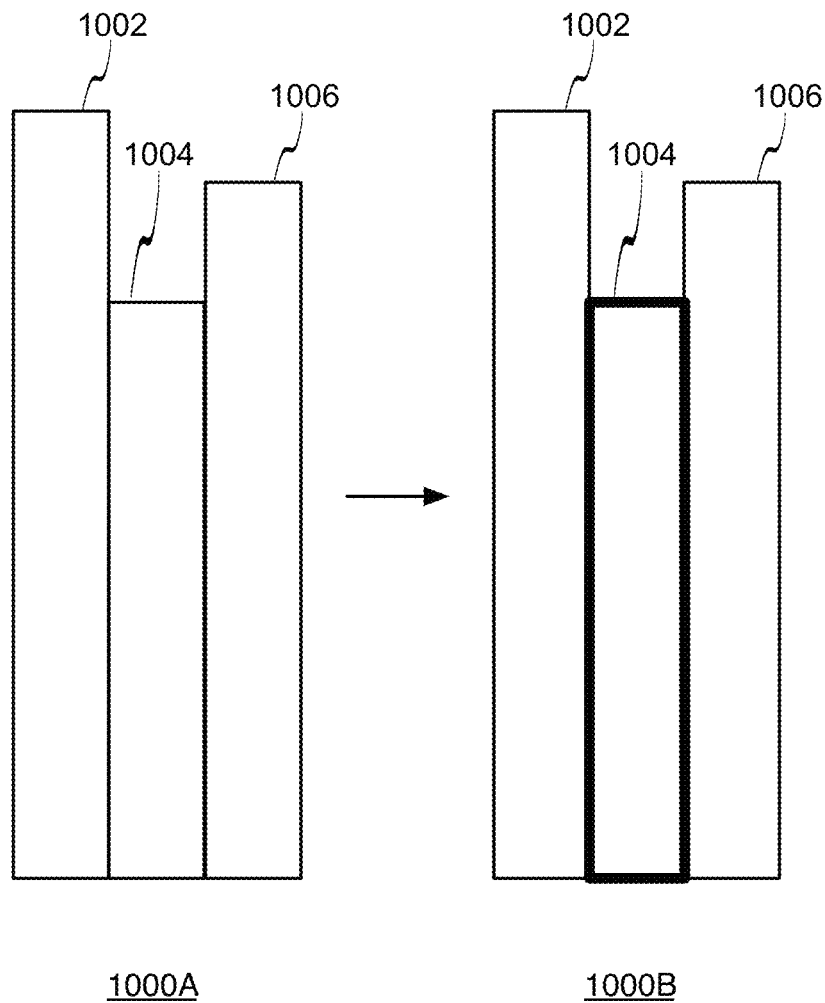
FIG. 10 illustrates an example bar chart, according to some implementations.

FIG. 10 illustrates an example bar chart 1000, according to some implementations. Bar chart 1000 is labeled 1000A and 1000B to indicate two states of bar chart 1000. Shown is bar chart 1000 in a first state (indicated by 1000A), where the system has rendered bars 1002, 1004, and 1006 based on individual rendering paths. In various implementations, a rendering path is an SVG object, or a collection of points from coordinate to coordinate in the bar chart. Each bar is rendered individually by its own separate rendering path. For ease of illustration, three bars are shown. The actual number of bars may vary and will depend on the particular implementation.

Because each bar is rendered individually and separately, a user may interact with each bar individually. For example, the user may select an individual bar by clicking on the bar with a mouse and pointer, by tapping on the bar on a touch screen display, etc.

Also shown is bar chart 1000 in a second state (indicated by 1000B), where the user has selected bar 1004. After bar 1004 is selected, the system may highlight bar 1004 to indicate that bar 1004 has been selected. The user may then interact with bar 1004 in various ways. For example, in some implementations, the system may enable the user to obtain particular information associated with bar 1004. In other example implementation, the system may enable the user to obtain other graphs associated with bar 1004. Other types of information are possible and will depend on the particular implementation.

Figure 11:
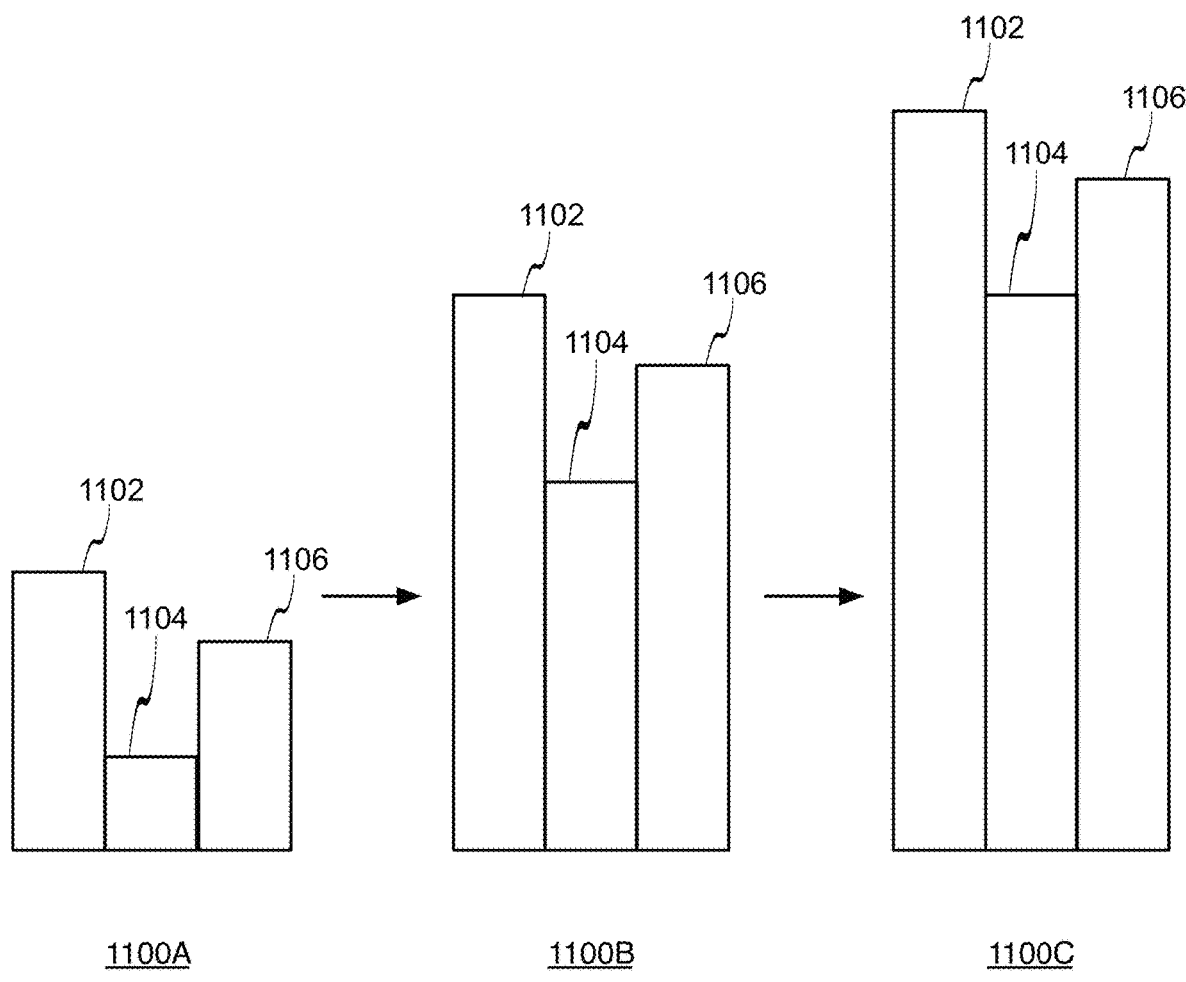
FIG. 11 illustrates an example bar chart, according to some implementations.

FIG. 11 illustrates an example bar chart 1100, according to some implementations. Bar chart 1100 is labeled 1100A, 1100B, and 1100C to indicate three states of bar chart 1100. In some implementations, the system may receive a user command to generate bar chart 1100, where the user command to generate bar chart 1100 is associated with an animation. In this particular example implementation, three bars 1102, 1104, and 1106 are animated in the display screen of a device such that bars 1102, 1104, and 1106 grow from lengths of zero (e.g., where no bars are shown) to a number of intermediary lengths (e.g., progressively longer lengths) to final lengths that correspond to the values of their respective data points. For ease of illustration, three bars are shown. The actual number of bars may vary and will depend on the particular implementation.

For example, shown is bar chart 1100 in a first intermediary state (indicated by 1100A), where the system has rendered bars 1102, 1104, and 1106 having particular lengths.

Also shown is bar chart 1100 in a second intermediary state (indicated by 1100B), where the system has rendered bars 1102, 1104, and 1106 having particular lengths that are longer that those lengths at the first state.

Also shown is bar chart 1100 in a final state (indicated by 1100C), where the system has rendered bars 1102, 1104, and 1106 having particular lengths that are longer that those lengths at the second state.

For ease of illustration, the first intermediary state 1100A of bar chart 1000 and the second intermediary state 1100B of bar chart 1000 show intermediary states of bars 1102, 1104, and 1106. The number of intermediary states may be numerous in order to create the animation, and the actual number of intermediary states will depend on the particular implementation. Using a single rendering path reduces the rendering time, and provides smooth animation. Otherwise, without the path aggregation technique, the rendering could be very slow and the resulting animation may appear choppy to the user.

As shown in FIGS. 10 and 11, bar chart 1000 and bar chart 1100 ultimately look the same but they function differently as their rendering paths are different (e.g., individual rendering paths of bar chart 1000 versus a single rendering path of bar chart 1100).

In various implementations, the path aggregation technique solves the problem where bar charts are fundamentally slower to draw than line or area charts in SVG. While a single line or area shape may represent numerous data points within a series or layer of bars, each bar represents one single data point. The large number of bars in a bar chart may bloat a document object model (DOM) and make the rendering slow. The path aggregation technique allows the bars to be rendered using one single shape, thus matching the performance of line and area charts. In various implementations, this path aggregation approach is used in non-interactive situations, such as rendering printable charts or the intermediate states during a chart animation.

As indicated herein, the path aggregation technique may render bars within one series of bars not as individual rectangle shapes but as one single path shape. The benefit is that the DOM becomes much smaller and the SVG rendering becomes much faster. It can be used even for charts with small datasets. For example, considering bars 1002, 1004, and 1006, the following individual rendering paths may be applied:

```
<svg width="200" height="300">
    <rect x="10" y="80" width="50" height="200/">
    <rect x="70" y="130" width="50" height="150/">
    <rect x="130" y="100" width="50" height="180/">
</svg>
```

Alternatively, the following aggregated rendering paths (one single path) may be applied:

```
<svg width="200" height="300">
    <path d="M10 80 H60 V280 H10 Z M70 130
    H120 V280 H70 Z M130 100
H180 V280 H130 Z"/>
    </svg>
```

The result will be indistinguishable visually, but the DOM is smaller and the rendering is faster.

While some implementations are described herein in the context of animation of a bar chart, these implementations of the path aggregation technique may also be applied to other bar chart features. For example, these implementations and others may also apply to panning and/or zooming.

Implementations described herein provide various benefits. For example, implementations handle arbitrarily large datasets, which addresses the challenge of unpredictable sizes of received datasets.

Figure 12:
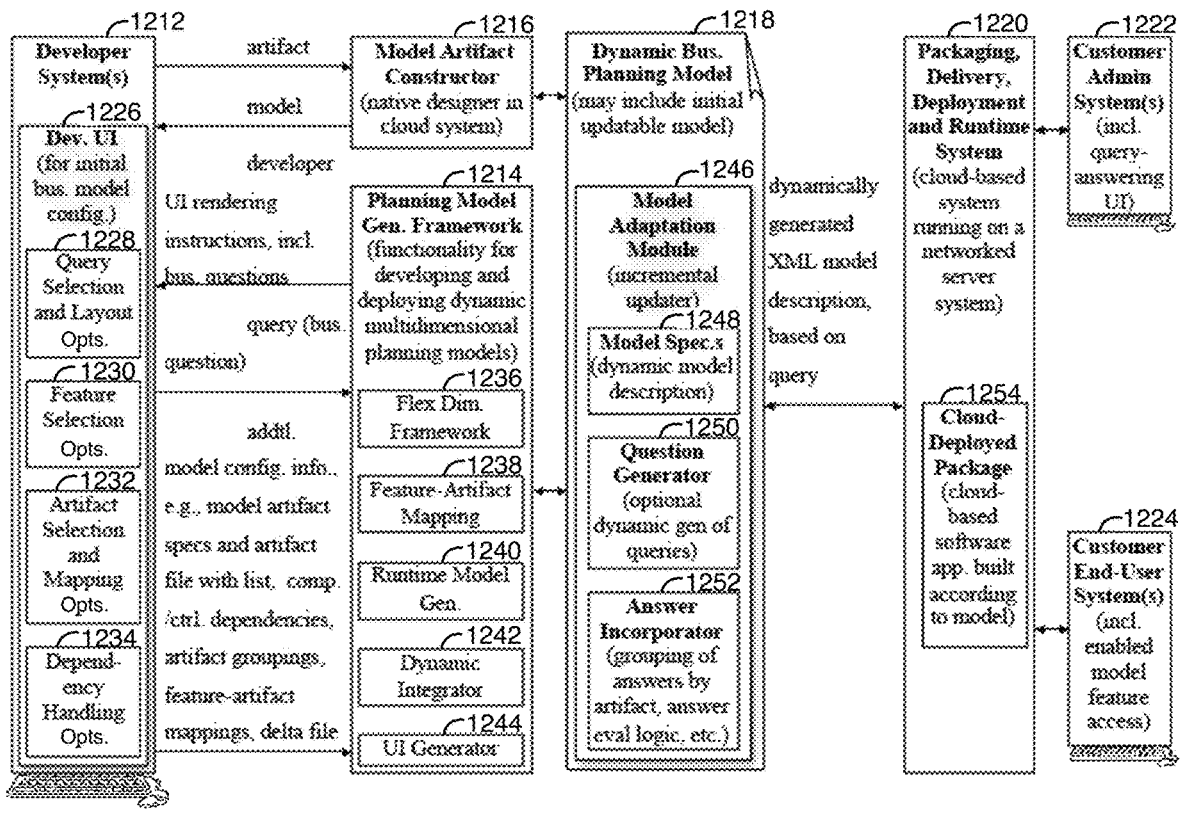
FIG. 12 illustrates an example block diagram of a system, which may be used for implementations described herein.

FIG. 12 illustrates an example block diagram of a system 1200, which may be used for implementations described herein. In various implementations, system 1200 is an enterprise-computing environment configured to enable initial development of a dynamic business planning model 1218. In various implementations, system 1200 incrementally updates business planning model 1218 to meet specific enterprise needs, and uses resulting updated business planning model 1218 as part of a cloud-based enterprise software application or service 1254 (labeled "Cloud-Deployed Package"). While system 1200 performs implementations described herein, in other implementations, any suitable component or combination of components associated with system 1200 or any suitable module or module s associated with system 1200 may facilitate performing the implementations described herein. In various implementations, system 1200 may not have all of the components shown and/or may have other elements including other types of modules instead of, or in addition to, those shown herein.

System 1200 includes a developer computer system 1212 (labeled "Developer System(s)") that is in communication with a planning model generation framework 1214 and a model artifact constructor 1216. Computer system 1212 may also be referred to herein as the developer system or the developer computer. Model artifact constructor 1216 may leverage preexisting functionality, e.g., as may be available via a native designer in a cloud computing system implemented as part of system 1200.

Planning model generation framework 1214 and model artifact constructor 1216 that are leveraged to develop business planning model 1218, may further communicate with a packing, delivery, deployment and runtime system and/or computing framework 1220 (labeled "Packaging, Delivery, Deployment and Runtime System"). Modules 1214-1220 may be hosted in a cloud, i.e., a server system accessible via a network, such as the Internet.

A cloud-deployed package 1254, i.e., software application, embodying business planning model 1218 is may be hosted in the cloud, i.e., cloud-based. For the purposes of the present discussion, cloud-based software may be any software run on one or more servers and accessible to client systems via a network used to communicate with the software.

In some implementations, cloud-deployed package 1254 may represent a software application that may provide one or more web services for use by other software applications, and/or may provide cloud-services, e.g., on a subscription basis, to one or more client systems, e.g., a customer administrator system 1222 (labeled Customer Admin System(s), and a customer end-user system 1224 (labeled Customer End-User System(s). For the purposes of the present discussion, the term "customer" refers to any user, such as an administrator and/or end user, e.g., who may be part of an organization that has access to cloud-deployed package 1254.

In some implementations, a developer system 1212 accesses model artifact constructor 1216 and planning model generation framework 1214 via a network, such as the Internet. Developer system 1212 may include a browser used to browse to the network address that provides access to functionality provided by model artifact constructor 1216 and planning model generation framework 1214.

After browsing to a network address allotted for system developers, designers, and/or other qualified personnel, various dynamic model-building functionality is accessible to the developer system, e.g., via various developer UI display screens 1226 (labeled "Dev. UI").

Software functionality may be any function, capability, or feature, e.g., stored or arranged data, that is provided via computer code, e.g., software. Generally, software functionality may be accessible via use of a UI, and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

Software functionality, or a set of software functionalities, that is/are associated with or used by a business planning model, is called a model feature (or simply feature) herein. Examples of features include, but are not limited to, software functionality for implementing indirect cash flow statements, income statements, and so on.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software. The terms UI control and UI component (or simply component) may be employed interchangeably herein.

A descriptor or characteristic of a business planning model and/or associated UI display screens and/or UI layout, is called a model artifact (or simply artifact) herein. Examples of model artifacts include, but are not limited to metadata (e.g., metadata describing a UI layout or UI model framework), dashboards, business rules, forms, dimensions, and so on.

Artifacts may represent or be associated with categories of features or software functionality. When functionality is associated with a business model artifact, the artifact may be seeded with one or more functionalities or features.

Artifacts and features may be dependent or independent. A dependent artifact or feature is one that relies upon the existence or operation of another artifact or feature for proper functioning. Similarly, an independent artifact or feature may be added to a model without requiring special handling of interdependencies, as discussed more fully below. Examples of potential dependent artifacts include, but are not limited to composite forms, rule sets, and so on.

A valid artifact may be any artifact that may be associated with (e.g., seeded with) one or more features that are available for a business planning model. The availability of a feature to an artifact may be defined in initial business planning model 1218, e.g., by a developer using business planning model designer software represented by planning model generation framework 1214 and model artifact constructor 16 of FIG. 1.

In some implementations, developer UI display screens 1226 include a query-selection UI display screen (and/or set of UI controls) 1228, a feature-selection UI display screen 1230, an artifact-selection UI display screen 1232 (labeled "Artifact Selection and Mapping Opts," and an artifact and feature dependency handling UI display screen 1234.

Planning model generation framework 1214 includes a flex-dimension framework 1236, a feature-artifact mapping module 1238, a runtime model generator 1240, a dynamic functionality integrator 1242, and a UI generator 1244.

Generated, dynamic, business planning model 1218, which may be defined by and/or specified via an extensible markup language (XML) document, includes a specification 1248 (labeled "Model Specs") of business planning model

1218, and optionally, embedded question generator code (or a link to code) 1250 and answer incorporator 1252, e.g., for facilitating incorporating answers to business questions, as may be provided via the customer administrator system 1222 (labeled "System(s)," as discussed more fully below.

Packaging, delivery, deployment, and runtime system 1220 hosts and runs deployed cloud-based software package or application 1254, also referred to as "cloud-deployed package" 1254. Functionality of deployed application 1254, also referred to as "cloud-deployed package 1254," is accessible to customer end-user client system 1224.

Note that in general, groupings of various modules of system 1200 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, a question generator 1250 and answer incorporator 1252 shown as part of dynamic business planning model 1218 may instead, or in addition, be incorporated into planning model generation framework 1214.

Furthermore, certain modules of planning model generation framework 1214 may be implemented client-side, e.g., on developer system 1212. In general, certain server-side, i.e., cloud-based modules (e.g., running on a server or server system) may be implemented client-side (e.g., running on a client computer communicating with a server), and vice versa, in a manner different than shown in FIG. 12.

In an example scenario, a business model developer (also called designer herein) employs developer system 1212, e.g., artifact-selection screen 1232, to specify, access, and/or configure model artifacts, leveraging model artifact constructor 1216. Artifact-selection screen 1232 presents one or more UI controls (which may provide so-called user options, or simply options) for facilitating developer construction, selection, and configuration of model artifacts, as well as UI controls enabling configuration and/or specification of mappings and/or rules associated with the artifacts. The mappings discussed herein refer to associations between business model artifacts and features, and are also called feature-artifact and/or artifact-feature mappings.

After developing and/or configuring a set of one or more business model artifacts, e.g., by leveraging artifact-selection screen(s) 1232 and associated model artifact constructor 1216, the resulting artifacts may be stored locally or via the server system that hosts modules 1214-1220.

Next, in the present example scenario, the developer employs feature-selection screen 1230 to select and/or configure a set of business model features. Feature construction and/or selection may also be facilitated via model artifact constructor 1216 and/or code run as part of planning model generation framework 1214, e.g., via code run on feature-artifact mapping module 1238.

After initial selection and/or configuration of a set of one or more model artifacts and one or more model features, the developer may employ one or more UI controls of artifact-selection screen 1232 to configure and/or specify initial mappings and/or associated mapping rules that define associations between the configured artifacts and features.

Artifact-selection and mapping screen 1232 may include UI controls that leverage the functionality of feature-artifact mapping module 1238 of planning model generation framework 1214. Feature-artifact mapping module 1238 may include additional code for implementing automatic feature-artifact mappings in accordance with groupings of business questions and/or answers to the business questions, e.g., so as to automatically update dynamic business planning model 1218, as discussed more fully below.

UI generator 1244 of planning model generation framework 1214 includes code for generating rendering instructions to render developer-side UI display screens 1226, and further includes code for generating rendering instructions for UI display screens of cloud-deployed package 1254, which are exposed to customer end-user system 1224.

Developer-side query-selection and layout options screen 1228 includes UI controls and access to associated functionality for defining, selecting, and/or grouping business questions (called queries) to be exposed in a UI display screen accessible to customer administrator system 1222. The UI display screens are displayed as part of the dynamic business planning model 1218 and are exposed to the customer administrator system 1222, and include a UI display screen that lists business questions that have been enabled for existing dynamic business planning model 1218.

The initial business questions selected by a developer using query-selection and layout options screen 1228 may be listed and/or otherwise formatted in accordance with developer-selected layout options provided via query-selection and layout options screen 1228. UI controls of query-selection and layout options screen 1228 provide developer-access to associated functionality (e.g., functionality which may be provided via UI generator 1244 and feature-artifact mapping module 1238 and/or other modules of planning model generation framework 1214) for defining, selecting, and/or otherwise configuring business questions and how the questions will be laid out in a UI display screen exposed to a customer administrator, e.g., via customer administrator system 1222.

Mappings of artifacts are grouped by business question or by business question group or type. Mappings of artifacts to features may depend, in part, on the business questions established via use of query-selection and layout options screen 1228.

The developer may further specify dependency-handling options via one or more UI controls provided in dependency-handling options screen 1234. The dependencies may include dependencies between business questions (e.g., in cases where the answer to one business question may affect other questions or answers, and dependencies between different artifacts (and/or groups or types of artifacts), and dependencies between different features (and/or groups or types of features). Such dependencies may require that a change (e.g., difference) in one question, artifact, and/or feature, be propagated to another question, artifact, and/or feature.

Various implementations discussed herein may employ difference or delta processing to ensure that dependencies are handled without introducing conflicts. This involves referencing the established associations and associated selected configuration options (e.g., as may be specified by a developer via dependency-handling options screen 1234) and making adjustments to the business model based thereon and in response to a detected change in an artifact, feature, question, etc.

Accordingly, developer system 1212 forwards business question selections and associated identifications, descriptions, and/or configuration information (e.g., as may be provided responsive to developer manipulation of query-selection and layout options screen 1228) to business planning model generation framework 1214. In addition, various additional UI controls included among developer UI display screens 1226 may enable specification and forwarding of additional information to planning model generation framework 1214, including, but not limited to additional business model configuration information, e.g., model artifact specifications, an artifact file listing artifacts for an initial business planning model, component (e.g., UI control) dependencies (between UI controls to be rendered and exposed via cloud-deployed package 1254), artifact grouping information, feature-artifact mapping data, delta file specifications (e.g., describing dependencies between various questions, artifacts, and/or features), feature specifications, flex dimension configuration parameters and/or specifications, and so on.

Business planning model generation framework 1214 then processes the inputs received via developer system 1212 to automatically construct an initial business planning model, also called the seed model. Some example modules usable to construct initial dynamic business planning model 1218 and to implement incremental updates thereto, include, but are not limited to flex dimension framework 1236, feature-artifact mapping module 1238, runtime model generator 1240, dynamic integrator 1242, and UI generator 1244.

Flex dimension framework 1236 includes computer code for enabling customer administrators (e.g., using customer administrator system 1222) and/or customer end users (e.g., using customer end-user system 1214) to add flex dimensions to various UI display screens exposed via cloud-deployed package 1254. Flex dimension framework 1236 then enables extension of business planning model 1218 in accordance with the added flex dimensions. Note that whether initial business planning model 1218 supports flex dimensions, which flex dimensions, if any, are supported, and behaviors of the flex dimensions, may be specified by a developer via one or more UI controls provided in developer UI display screens 1226.

Feature-artifact mapping module 1238 includes computer code for enabling automatic implementation of changes introduced to dynamic business planning model 1218 in response to answers provided in response to business questions posed to an administrator (or other authorized user) of customer administrator system 1222. In particular, when an administrator provides a new answer to a question (e.g., which may be posed via a UI prompt, such as a check box), any artifacts associated with the question are then automatically populated with features via feature-artifact mapping module 1238. The resulting populated artifacts are then incorporated into updated dynamic business planning model 1218 after any artifact and/or feature dependencies are handled and/or deltas are processed.

Runtime model generator 1240 includes computer code for automatically generating a new or updated dynamic business planning model 1218 for incorporation into cloud-deployed package 1254. The updates to running cloud-deployed package 1254 by runtime model generator 1240 may be implemented via patching and/or other known technologies for adjusting running software applications.

Dynamic integrator 1242, which may communicate with other modules of planning model generation framework 1214, facilitates implementing delta differencing processing to accommodate newly added functionality without introducing conflicts in updated business planning model 1218. Integrator 1242 may further include computer code for facilitating and/or ensuring efficient interoperability between different intercommunicating business planning models and associated software applications deployed via packaging, delivery, deployment, and runtime system 1220.

Note that information exchange between developer system 1212 and between various cloud-based modules 1214-1220 may be implemented via exchange of XML files that are also transferred between the system and modules. Furthermore, dynamic business planning model 1218 may be implemented substantially via an XML document defining the model.

In some implementations, dynamic business planning model 1218 includes a model adaptation module 1246, which includes computer code for facilitating some self-adaptation of dynamic business planning model 1218. Note that in other implementations, model adaptation module 1246 may be included instead in planning model generation framework 1214.

In some implementations, model adaptation module 1246 includes, in addition to a description of the business planning model (including a description of existing questions, artifacts, and associated features), a specification of code for dynamic question generator 1250 and answer incorporator 1252.

Dynamic question generator 1250 may include computer code (and/or links thereto) for automatically adjusting a list of business questions exposed via a UI of customer administrator system 1222, e.g., in response to one or more answers provided thereby by an administrator using customer administrator system 1222. This may be particularly useful for reconfiguring listing of displayed questions in response to an answer to a question that affects the validity of other questions displayed in (or to be displayed among) the listing of business questions.

Answer incorporator 1252 may include computer code (and/or links thereto) for adjusting groupings of artifacts by answers and/or answer type or category. Answers to the business questions may be evaluated by evaluation logic to determine how a new listing of questions should be generated and laid out (in the UI exposed to the customer administrator system 1222).

Note that various modules 1236-1244 of the business planning model generation framework 1214 may intercommunicate, e.g., via interfacing functionality incorporated therein. Similarly modules 1248-1252 of model adaptation module 1246 of dynamic business planning model 1218 may intercommunicate.

Once initial business planning model 1218 is developed and/or configured via developer system 1212, it can be deployed as cloud-deployed package 1254, which is then made available to customer administrator system 1222 and customer end-user system 1224. The customer administrator may then use customer administrator system 1222 to answer business questions. The resulting answers then feed back to framework modules 1214-1220, which then adapt or update dynamic business planning model 1218 in accordance with the answers. The adjustment to dynamic business planning model 1218 is effectuated through use of artifacts, which are then mapped or seeded with features corresponding to the answered questions, and in accordance with the answers to the answered questions, as discussed more fully below.

Accordingly, the present example implementation may enable customers to substantially forgo, configuring and/or updating business planning software. Several business planning processes (which may be associated with different business planning models and/or sub-models) may be selectively and incrementally rolled out to customer end users (e.g., users of customer end-user system(s) 1224). Furthermore, integration between added features (e.g., sets of software functionality associated with different business processes) is automatically accommodated, e.g., via dynamic integrator 1242 and feature-artifact mapping module 1238 of business planning model generation framework 1214.

Furthermore, by enabling customer addition of and configuration of flex dimensions to dynamic business planning model 1218, the resulting automatically handled dimensions can significantly reduce implementation time for customers to implement new features and associated business model artifacts.

Customers now have significant flexibility and options for configuring various planning business processes. Customers can leverage these configuration capabilities, reduce implementation time, and continue building the model over time, as necessary to meet the needs of the customer organization.

Furthermore, business planning models developed and deployed using system 1200 may now readily evolve and adapt to meet different and/or changing business needs while remaining consistent with industry-standard best practices. Furthermore, as best practices change, dynamic business planning model 1218 may adapt to comply with the new best practices.

Figure 13:
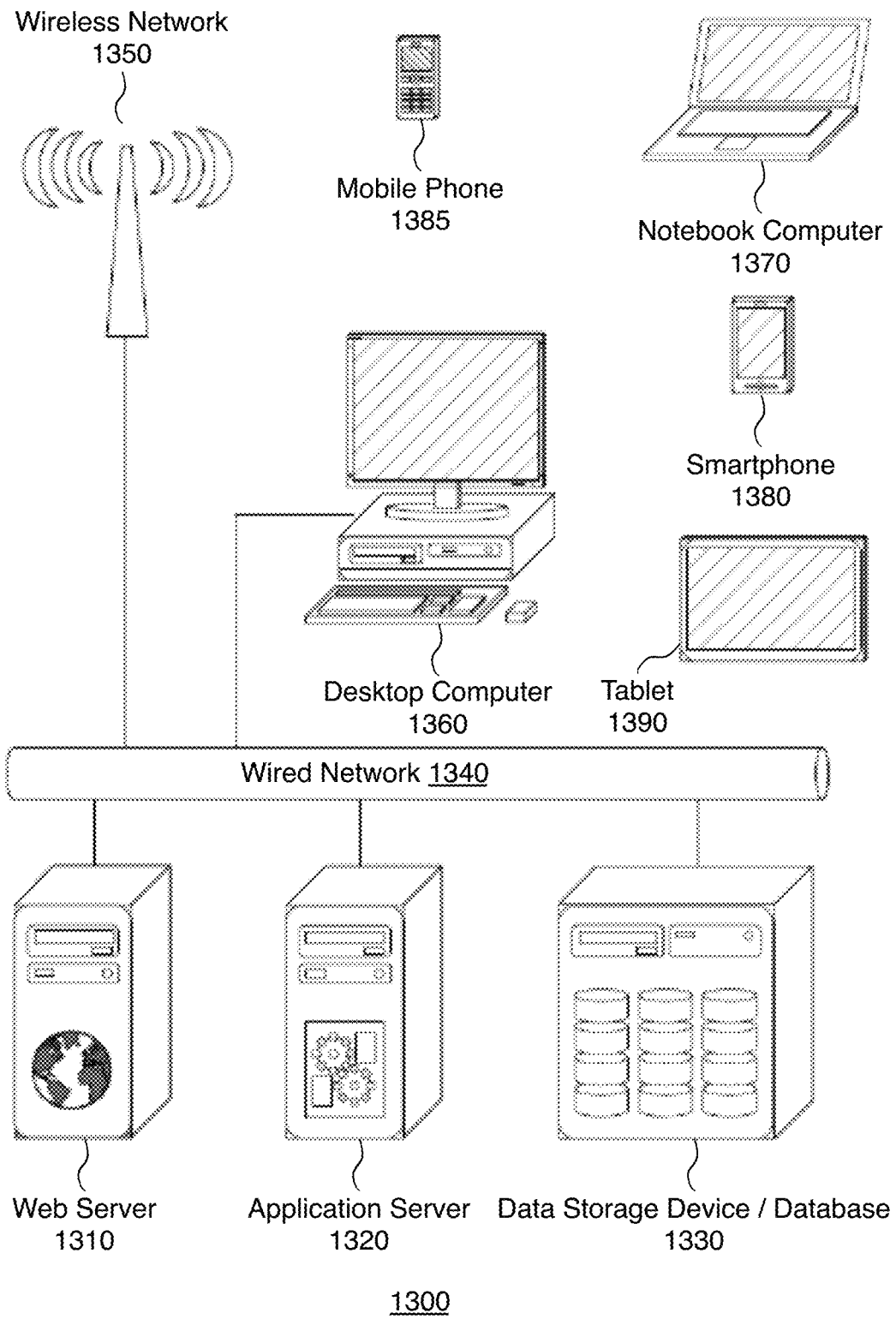
FIG. 13 illustrates an example block diagram of a system, which may be used for implementations described herein.

FIG. 13 illustrates an example block diagram of a system 1300, which may be used for implementations described herein. Example system 1300 is capable of supporting or running various hardware and/or software modules and associated methods discussed with reference to FIGS. 1 and 12. Note that certain implementations may be implemented using one or more standalone applications (for example, residing in a user device) and/or one or more web-based applications implemented using a combination of client-side and server-side code. While system 1300 performs implementations described herein, in other implementations, any suitable component or combination of components associated with system 1300 or any suitable processor or processors associated with system 1300 may facilitate performing the implementations described herein. In various implementations, system 1300 may not have all of the components shown and/or may have other elements including other types of components instead of, or in addition to, those shown herein.

General system 1300 includes user devices 1360-1390, including one or more desktop computers 1360, one or more notebook computers 1370, one or more smart-phones 1380, one or more mobile phones 1385, and one or more tablets 1390. General system 1300 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although system 1300 is shown with five user devices, any number of user devices can be supported.

A web server 1310 is used to process requests from web browsers and standalone applications for web pages, electronic documents, enterprise data or other content, and other data from the user computers. Web server 1310 may also provide push data or syndicated content, such as RSS feeds, of data related to enterprise operations.

An application server 1320 operates one or more applications. The applications can be implemented as one or more scripts or programs written in any programming language, such as Java, C, C++, C#, or any scripting language, such as JavaScript or European computer manufacturers association script (ECMAScript), Perl, hypertext preprocessor (PHP), Python, Ruby, or tool command language (TCL). Applications can be built using libraries or application frameworks, such as Rails, Enterprise JavaBeans, or .NET. Web content may be created using hypertext markup language (HTML), cascading style sheets (CSS), and other web technology, including templating languages and parsers.

The data applications running on application server 1320 are adapted to process input data and user computer requests and can store or retrieve data from data storage device or database 1330. Database 1330 stores data created and used by the data applications. In some implementations, database 1330 includes a relational database that is adapted to store, update, and retrieve data in response to SQL format commands or other database query languages. Other implementations may use unstructured data storage architectures and Not Only SQL (NoSQL) databases.

In some implementations, application server 1320 includes one or more general-purpose computers capable of executing programs or scripts. In some implementations, web server 1310 is implemented as an application running on the one or more general-purpose computers. Web server 1310 and application server 1320 may be combined and executed on the same computers.

An electronic communication network 1340-1350 enables communication between user computers 1360-1390, web server 1310, application server 1320, and database 1330. In some implementations, networks 1340-1350 may further include any form of electrical or optical communication devices, including wired network 1340 and wireless network 1350. Networks 1340-1350 may also incorporate one or more local-area networks, such as an Ethernet network, wide-area networks, such as the Internet; cellular carrier data networks; and virtual networks, such as a virtual private network.

System 1300 is one example for executing applications according to some implementations. In some implementations, application server 1310, web server 1320, and optionally database 1330 can be combined into a single server computer application and system. In further implementations, virtualization and virtual machine applications may be used to implement one or more of application server 1310, web server 1320, and database 1330.

In still further implementations, all or a portion of the web and application serving functions may be integrated into an application running on each of the user computers. For example, a JavaScript application on the user computer may be used to retrieve or analyze data and display portions of the applications.

In various implementations, system 1300 may not have all of the components shown and/or may have other elements including other types of components instead of, or in addition to, those shown herein.

With reference to FIGS. 12 and 13, developer system(s) 1212, customer administrator system(s) 1222, and customer end-user system(s) 1224 of FIG. 12 may be implemented in whole or in part via one or more of desktop computer 1360, notebook computer 1370, smartphone 1380, mobile phone 1385, and tablet 1390 of FIG. 13 and/or other computing devices such as computing system 1200 of FIG. 12. In some implementations, computing devices 1360-1390 run browsers, e.g., used to display developer UI(s) 1226 and UIs of customer administrator system(s) 1222 and customer end-user system(s) 1224 of FIG. 12.

In some implementations, browsers of systems 1212, 1222, and 1224 of FIG. 12 connect to the Internet, represented by wired network 1340 and/or wireless network 1350 as shown in FIG. 13, to access one or more network-coupled servers, databases, and/or associated cloud-based functionality, as represented by modules 1214-1220 of FIG. 12. Note that one or more of web server 1310, application server 1320, and data storage device or database 1330 shown in FIG. 13 may be used to host software corresponding to modules 1214-1220 of FIG. 12, as detailed more fully below.

In some implementations, model artifact constructor 1216, planning model generation framework 1214 (including accompanying flex dimension framework 1236, feature-artifact mapping module 1238, runtime model generator 1240, dynamic integrator 1242, and UI generator 1244), dynamic business planning module 1218 and accompanying model adaptation module 1246 (including model specifications 1248, question generator 1250, and answer incorporator 1252), and packaging, delivery, deployment, and runtime system 1220 (and accompanying cloud-deployed package 1254) of FIG. 12 run in a cloud computing environment that includes a collection of plural web servers 1310, application servers 1320, and data storage devices 1330 shown in FIG. 13.

For example, in some implementations, planning model generation framework 1214 and model artifact constructor 1216 of FIG. 12 run on a process cloud that communicates with a document cloud via an integration mechanism, e.g., middleware, APIs, web services, etc. The document cloud maintains data storage devices 1230 of FIG. 12 to maintain data that is generated by customers, e.g., via customer end-user systems 1224 of FIG. 12 through use of cloud-deployed package 1254. The process cloud in combination with the document cloud act as an overall cloud that supports development, deployment, dynamic adaptation, and use of dynamic software applications and accompanying models (e.g., dynamic business planning model 1218 of FIG. 12) shown in FIG. 12.

In general, software developers e.g., users of developer systems 1212 of FIG. 12, may subscribe to certain cloud services to facilitate development of software applications and storage of associated files. A cloud service that is configured for software application or process flow development is called a process cloud service (PCS).

A process cloud service may employ a networked database, e.g., data storage device 1330 of FIG. 13 or database 120 of FIG. 1, to store files and other objects used by a given software program being developed. Server-side development environments may be accessible to developers via browsers. The development environments may be backed by the PCS, such that developed software application files are stored in the PCS database corresponding to the one or more of data storage devices 1330 of FIG. 13 or database 120 of FIG. 1.

A document cloud may include document management functionality in communication with folder structures, and documents and may incorporate functionality for adding rich metadata documents and folders. The document management functionality may include metadata services (MDS) for characterizing folders and documents and associated structures with various types of metadata. The document management functionality may further include software (which may include a combination of webpage code from web server 1310 of FIG. 13 and supporting application code of application server 1320 of FIG. 13, where the webpage code may call the application code using web services, APIs, etc.) for generating one or more customer UI display screens, e.g., UI display screens presented via browsers of customer administrator systems 1222 and customer end-user systems 1224 of FIG. 12.

In some implementations, the UI display screens include accompanying UI controls and associated options. Example options include options to browse, create, delete, define, upload, download, etc., folders, structures, and documents, etc., as maintained via the folder structures and documents.

In some implementations, browsers used by developer system 1212, customer administrator system 1222, and customer end-user system 1224 of FIG. 12, interface with web servers 1310 shown in FIG. 13 to access websites and accompanying webpage code, which is backed by applications used to implement modules 1216-1220 of FIG. 12. The webpage code of web servers 1310 of FIG. 13 uses web services, APIs, and/or other interfacing mechanisms to communicate with application software hosted on application servers 1320 of FIG. 13 of the cloud, which includes a collection of web servers 1310, application servers 1320, and data storage devices 1330 of FIG. 13.

Various implementations discussed herein may provide substantial benefits in terms of providing efficiencies in systems and methods that achieve a new and useful end as they pertain to new software adaptability. In particular, certain implementations discussed herein uniquely leverage input from customers, the input of which may change over time as user needs change, to enable substantial hereto-for-not possible or practical dynamic software model reconfiguration and/or reconstruction.

Certain implementations may provide virtually automatic incorporation of such inputs into a seamlessly adaptable software package that is responsive to the changing user needs and automatically seamlessly handles software integrations.

Accordingly, various implementations provide new capabilities for efficient software adaptation, in part by uniquely leveraging associations between user-provided answers to questions, sets of software model artifacts, sets of software functionality, and mappings or relationships.

Figure 14:
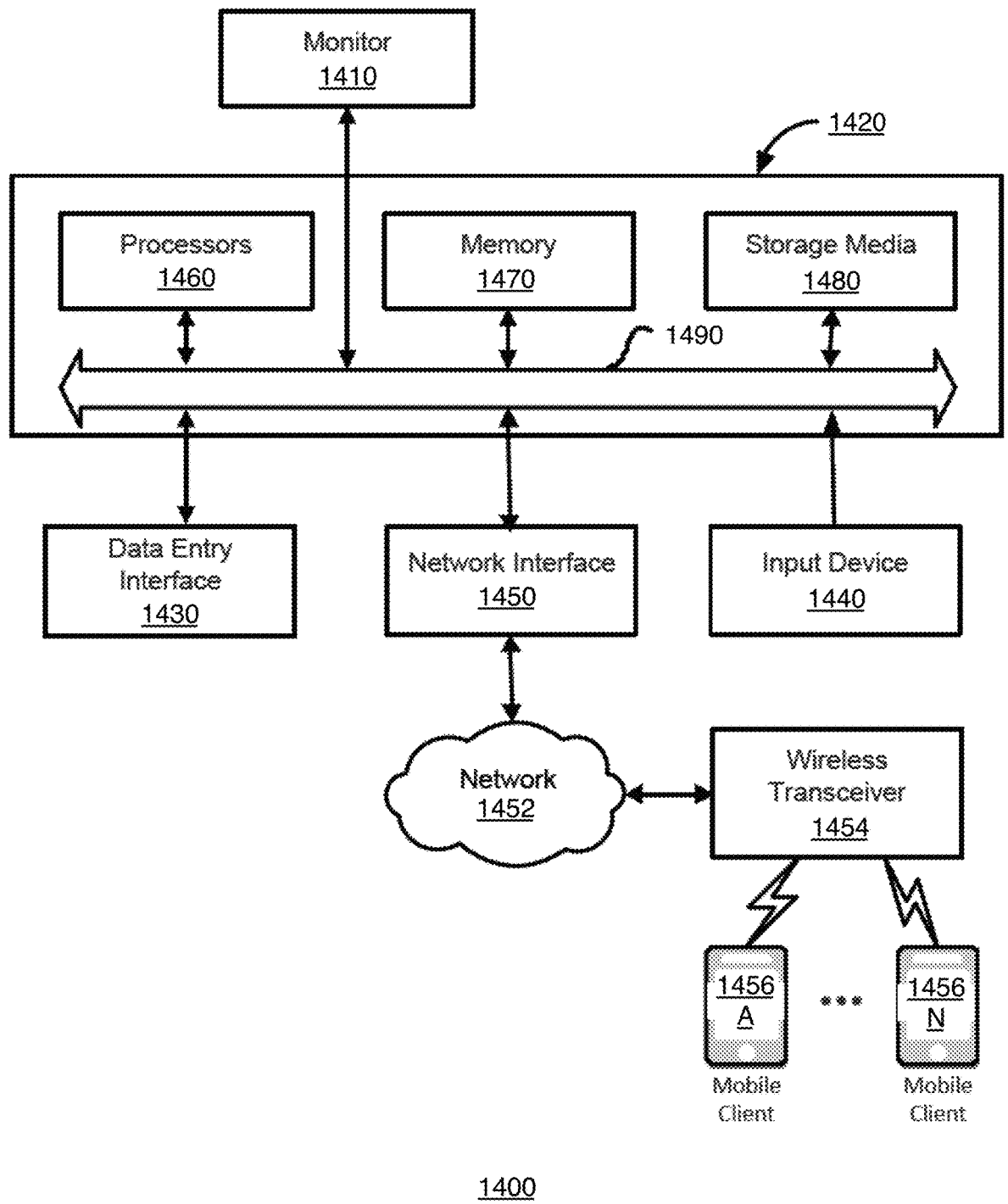
FIG. 14 illustrates an example block diagram of a network environment, which may be used for implementations described herein.

FIG. 14 illustrates an example block diagram of a network environment 1400, which may be used for implementations described herein. Network environment 1400 is merely illustrative and not intended to limit the scope of the claims. One of ordinary skill in the art would recognize other variations, modifications, and alternatives. For example, network environment 1400 may be implemented in a distributed client-server configuration having one or more client devices in communication with one or more server systems.

In one exemplary implementation, network environment 1400 includes a display device such as a monitor 1410, a computer 1420, a data entry interface 1430 such as a keyboard, touch device, and the like, an input device 1440, a network interface 1450, and the like. Input device 1440 is typically implemented as a computer mouse, a trackball, a track pad, wireless remote, tablet, touch screen, and the like. Moreover, input device 1440 typically allows a user to select and operate objects, icons, text, characters, and the like that appear, for example, on the monitor 1410.

Network interface 1450 may include an Ethernet card, a modem (telephone, satellite, cable, integrated services digital network (ISDN), etc.), an asynchronous digital subscriber line (DSL) unit, and the like. Furthermore, network interface 1450 may be physically integrated on the motherboard of computer 1420, may be a software program, such as soft DSL, or the like.

Network environment 1400 may also include software that enables communications over communication network 1452 such as the hypertext transfer protocol (HTTP), transmission control protocol/Internet protocol (TCP/IP), real-time transport protocol/real-time streaming protocol (RTP/RTSP), protocols, wireless application protocol (WAP), Institute of Electrical and Electronics Engineers (IEEE)

802.11 protocols, and the like. In addition to and/or alternatively, other communications software and transfer protocols may also be used, for example Internetwork packet exchange (IPX), user datagram protocol (UDP) or the like.

Communication network 1452 may include a local area network, a wide area network, a wireless network, an Intranet, the Internet, a private network, a public network, a switched network, or any other suitable communication network, such as for example cloud networks. Communication network 1452 may include many interconnected computer systems and any suitable communication links such as hardwire links, optical links, satellite or other wireless communications links such as Bluetooth, WIFI, wave propagation links, or any other suitable mechanisms for communication of information. For example, communication network 1452 may communicate to one or more mobile wireless devices 1456A-N, such as mobile phones, tablets, and the like, via a base station such as wireless transceiver 1454.

Computer 1420 may include familiar computer components such as one or more processors 1460, and memory storage devices, such as a memory 1470, e.g., random access memory (RAM), storage media 1480, and system bus 1490 interconnecting the above components. In one embodiment, computer 1420 is a PC compatible computer having multiple microprocessors, graphics processing units (GPU), and the like. While a computer is shown, it will be readily apparent to one of ordinary skill in the art that many other hardware and software configurations are suitable for use with implementations described herein. While computer 1420 performs implementations described herein, in other implementations, any suitable component or combination of components associated with computer 1420 or any suitable processor or processors associated with computer 1420 may facilitate performing the implementations described herein. In various implementations, computer 1400 may not have all of the components shown and/or may have other elements including other types of components instead of, or in addition to, those shown herein.

Memory 1470 and Storage media 1480 are examples of non-transitory tangible media for storage of data, audio/video files, computer programs or program instructions, and the like. Other types of tangible media include disk drives, solid-state drives, floppy disks, optical storage media such as compact disc-read only memory (CD-ROMS) and bar codes, semiconductor memories such as flash drives, flash memories, read-only-memories (ROMS), battery-backed volatile memories, networked storage devices, cloud storage, and the like.

Although the description has been described with respect to particular embodiments thereof, these particular embodiments are merely illustrative, and not restrictive. For example, while various implementations discussed herein address development, deployment, and use of dynamic business planning models used to implement cloud-based enterprise software applications and associated services, implementations are not limited thereto.

Various implementations need not be deployed via an Internet cloud, but instead may be hosted on an internal enterprise server on a local network. Furthermore various implementations may be implemented as desktop software, such that the incremental updating happens on the end-user computer on which the software leveraging the dynamic planning model runs. In addition, implementations are not limited to use in conventional business applications and computing environments, and may be used, for example, by governments, universities, and other organizations to facilitate various types of planning activities. In addition, implementations need not be limited to planning software, but may be used to dynamically update different types of software that may benefit by the ability to dynamically adapt to specific needs and/or changing needs of an organization and/or associated computing environment.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer-readable storage medium carrying program instructions thereon, the program instructions when executed by one or more processors cause the one or more processors to perform operations comprising:
receiving a plurality of data points, wherein each data point of the plurality of data points is associated with a value;

determining a plurality of bars of a bar chart based on the plurality of data points, wherein each bar of the plurality of bars has a length representing the value of the respective data point;

associating a plurality of pixels used to render the bar chart with the respective data points of the plurality of bars, wherein sets of at least portions of pixels of the plurality of pixels are associated with one or more data points; and rendering, for a first set of at least portions of pixels associated with two or more overlapping bars, a highest positive bar or a lowest negative bar, wherein at least one of the two or more overlapping bars is not rendered.

2. The non-transitory computer-readable storage medium of claim 1, wherein the sets of at least portions of pixels include columns of the pixels.

3. The non-transitory computer-readable storage medium of claim 1, wherein the rendering includes animation of the plurality of bars extending to the respective lengths.

4. The non-transitory computer-readable storage medium of claim 3, wherein the animation includes simultaneously extending the plurality of bars to change together from lengths of zero, to a number of respective intermediary lengths, and to the respective lengths that correspond to the values of the respective data points.

5. The non-transitory computer-readable storage medium of claim 4, wherein the animation is in response to receiving a user request for the animation and absent the user request being received, the rendering is by individual bar rendering paths.

6. The non-transitory computer-readable storage medium of claim 1, further comprising rendering by animation, visual aspects of the plurality of bars changing together to achieve a zooming or panning effect of the plurality of bars.

7. The non-transitory computer-readable storage medium of claim 1, wherein each bar of the plurality of bars has a pre-defined width of less than a pixel.

8. The non-transitory computer-readable storage medium of claim 7, wherein the rendering is of the highest positive bar, and the operations further comprise:

rendering for a second set of at least portions of pixels associated with two or more overlapping bars, a lowest negative bar, wherein at least one of the two or more overlapping bars is not rendered.

9. A method for chart rendering optimization, the method comprising:

receiving a plurality of data points, wherein each data point of the plurality of data points is associated with a value;

determining a plurality of bars of a bar chart based on the plurality of data points, wherein each bar of the plurality of bars has a length representing the value of the respective data point;

associating a plurality of pixels used to render the bar chart with the respective data points of the plurality of bars, wherein sets of at least portions of pixels of the plurality of pixels are associated with one or more data points; and rendering, for a first set of at least portions of pixels associated with two or more overlapping bars, a highest positive bar or a lowest negative bar, wherein at least one of the two or more overlapping bars is not rendered.

10. The method of claim 9, wherein the sets of at least portions of pixels include columns of the pixels.

11. The method of claim 9, wherein the rendering includes animation of the plurality of bars extending to the respective lengths.

12. The method of claim 11, wherein the animation includes simultaneously extending the plurality of bars to change together from lengths of zero, to a number of respective intermediary lengths, and to the respective lengths that correspond to the values of the respective data points.

13. The method of claim 12, wherein the animation is in response to receiving a user request for the animation and absent the user request being received, the rendering is by individual bar rendering paths.

14. The method of claim 9, wherein each bar of the plurality of bars has a pre-defined width of less than a pixel.

15. The method of claim 9, wherein the rendering is of the highest positive bar, and the method further comprises:

rendering for a second set of at least portions of pixels associated with two or more overlapping bars, a lowest negative bar, wherein at least one of the two or more overlapping bars is not rendered.

16. An apparatus comprising:

one or more processors; and logic encoded in one or more non-transitory computer-readable storage media for execution by the one or more processors and when executed operable to perform operations comprising:

receiving a plurality of data points, wherein each data point of the plurality of data points is associated with a value;

determining a plurality of bars of a bar chart based on the plurality of data points, wherein each bar of the plurality of bars has a length representing the value of the respective data point;

associating a plurality of pixels used to render the bar chart with the respective data points of the plurality of bars, wherein sets of at least portions of pixels of the plurality of pixels are associated with one or more data points; and rendering, for a first set of at least portions of pixels associated with two or more overlapping bars, a highest positive bar or a lowest negative bar, wherein at least one of the two or more overlapping bars is not rendered.

17. The apparatus of claim 16, wherein the sets of at least portions of pixels include columns of the pixels.

18. The apparatus of claim 16, wherein the rendering includes animation of the plurality of bars extending to the respective lengths.

19. The apparatus of claim 18, wherein the animation includes simultaneously extending the plurality of bars to change together from lengths of zero, to a number of respective intermediary lengths, and to the respective lengths that correspond to the values of the respective data points.

20. The apparatus of claim 16, wherein each bar of the plurality of bars has a pre-defined width of less than a pixel.

* * * * *

UNITED STATES PATENT AND TRADEMARK OFFICE
CERTIFICATE OF CORRECTION

PATENT NO. : 10,930,036 B2  
APPLICATION NO. : 16/859610  
DATED : February 23, 2021  
INVENTOR(S) : Ho et al.

Page 1 of 1

It is certified that error appears in the above-identified patent and that said Letters Patent is hereby corrected as shown below:

In the Specification

In Column 1, Line 8, delete "OPTIMIZATION" and insert -- OPTIMIZATION, --, therefor.

In Column 12, Line 41, delete "height="200/">" and insert -- height="200"/> --, therefor.

In Column 12, Line 42, delete "height="150/">" and insert -- height="150"/> --, therefor.

In Column 12, Line 43, delete "height="180/">" and insert -- height="180"/> --, therefor.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*